US008243909B2

(12) United States Patent
Wood et al.

(10) Patent No.: US 8,243,909 B2
(45) Date of Patent: Aug. 14, 2012

(54) PROGRAMMABLE CALLER ID

(75) Inventors: Gennamin Wood, Oviedo, FL (US);
Kevin Forsberg, Oviedo, FL (US)

(73) Assignee: AT&T Intellectual Property I, L.P.,
Atlanta, GA (US)

( * ) Notice: Subject to any disclaimer, the term of this patent is extended or adjusted under 35 U.S.C. 154(b) by 1057 days.

(21) Appl. No.: 11/895,008

(22) Filed: Aug. 22, 2007

(65) Prior Publication Data
US 2009/0052644 A1 Feb. 26, 2009

(51) Int. Cl.
H04M 3/42 (2006.01)
H04M 1/57 (2006.01)
H04M 3/436 (2006.01)
H04M 15/06 (2006.01)

(52) U.S. Cl. .............. 379/210.03; 379/142.06; 379/196; 379/197; 379/199; 379/201.02

(58) Field of Classification Search ............. 379/210.02, 379/142.06, 201.01, 188, 201.02, 210.03, 379/196–199
See application file for complete search history.

(56) References Cited

U.S. PATENT DOCUMENTS

| 4,266,098 A | 5/1981 | Novak |
| 4,268,722 A | 5/1981 | Little et al. |
| 4,277,649 A | 7/1981 | Sheinbein |
| 4,582,956 A | 4/1986 | Doughty |
| 4,649,433 A | 3/1987 | Verhoeven |
| 4,649,533 A | 3/1987 | Chorley et al. |
| 4,663,777 A | 5/1987 | Szeto |
| 4,674,115 A | 6/1987 | Kaleita et al. |
| 4,698,839 A | 10/1987 | DeVaney et al. |
| 4,791,664 A | 12/1988 | Lutz et al. |
| 4,797,911 A | 1/1989 | Szlam et al. |
| 4,802,202 A | 1/1989 | Takahashi et al. |
| 4,817,133 A | 3/1989 | Takahashi et al. |
| 4,823,304 A | 4/1989 | Frantz et al. |
| 4,845,743 A | 7/1989 | Lutz |
| 4,850,013 A | 7/1989 | Rose |
| 4,850,103 A | 7/1989 | Takemoto et al. |

(Continued)

FOREIGN PATENT DOCUMENTS
EP 0821511 1/1998
(Continued)

OTHER PUBLICATIONS

AASTRA Telecom, Press Release, Aastra Telecom Introduces CNX Conference Bridge, Aug. 29, 2005, 1 page.
(Continued)

Primary Examiner — Harry Hong
(74) Attorney, Agent, or Firm — Cantor Colburn LLP

(57) ABSTRACT

Methods and systems are disclosed for providing Programmable Caller ID Screening services. One method monitors a telephone call for a call screening request for commercial, residential, and other identifiers of incoming calls. An action is taken in response to the call screening request. The action could be playing an announcement, terminating the connection, forwarding to voice mail, storing the ICLID information in a database, adding the ICLID information to a Do Not Call list, updating a subscriber's profile with the ICLID information, and/or storing the ICLID information in a subscriber's blocked communications list. The call screening request may comprise a Dual-Tone Multi-Frequency, a softkey entry, and/or a data message. Subsequent incoming calls from the calling telephone number are characterized as undesirable and are screened from alerting or otherwise establishing a communications connection to the called telephone number.

7 Claims, 11 Drawing Sheets

U.S. PATENT DOCUMENTS

| | | |
|---|---|---|
| 4,995,075 A | 2/1991 | Angiolillo-Bent et al. |
| 5,029,196 A | 7/1991 | Morganstein |
| 5,109,405 A | 4/1992 | Morganstein |
| 5,121,423 A | 6/1992 | Morihiro et al. |
| 5,151,929 A | 9/1992 | Wolf |
| 5,157,712 A | 10/1992 | Wallen, Jr. |
| 5,161,181 A | 11/1992 | Zwick |
| 5,200,994 A | 4/1993 | Sasano et al. |
| 5,206,901 A | 4/1993 | Harlow et al. |
| D338,889 S | 8/1993 | Fuqua et al. |
| 5,260,987 A | 11/1993 | Mauger |
| 5,263,084 A | 11/1993 | Chaput et al. |
| 5,265,145 A | 11/1993 | Lim |
| 5,274,699 A | 12/1993 | Ranz |
| 5,278,894 A | 1/1994 | Shaw |
| 5,289,542 A | 2/1994 | Kessler |
| 5,315,650 A | 5/1994 | Smith et al. |
| 5,329,578 A | 7/1994 | Brennan et al. |
| 5,333,152 A | 7/1994 | Wilber |
| 5,333,186 A | 7/1994 | Gupta |
| 5,338,889 A | 8/1994 | Vora et al. |
| 5,341,411 A | 8/1994 | Hashimoto |
| 5,347,574 A | 9/1994 | Morganstein |
| 5,361,295 A | 11/1994 | Solomon et al. |
| 5,383,466 A | 1/1995 | Partika |
| 5,386,460 A | 1/1995 | Boakes et al. |
| 5,388,150 A | 2/1995 | Schneyer et al. |
| 5,413,605 A | 5/1995 | Ashby et al. |
| 5,420,910 A | 5/1995 | Rudokas et al. |
| 5,420,914 A | 5/1995 | Blumhardt |
| 5,420,920 A | 5/1995 | Capper et al. |
| 5,425,076 A | 6/1995 | Knippelmier |
| 5,425,089 A | 6/1995 | Chan et al. |
| 5,430,719 A | 7/1995 | Weisser, Jr. |
| 5,446,785 A | 8/1995 | Hirai |
| 5,452,089 A | 9/1995 | Bushman |
| 5,452,346 A | 9/1995 | Miyamoto |
| 5,459,779 A | 10/1995 | Backaus et al. |
| 5,466,785 A | 11/1995 | De Framond |
| 5,467,388 A | 11/1995 | Redd, Jr. et al. |
| 5,475,748 A | 12/1995 | Jones |
| 5,481,594 A | 1/1996 | Shen et al. |
| 5,481,599 A | 1/1996 | MacAllister et al. |
| 5,481,602 A | 1/1996 | Griffiths et al. |
| 5,490,205 A | 2/1996 | Kondo et al. |
| 5,497,414 A | 3/1996 | Bartholomew |
| 5,502,762 A | 3/1996 | Andrew et al. |
| 5,506,893 A | 4/1996 | Buscher et al. |
| 5,511,111 A | 4/1996 | Serbetcioglu et al. |
| 5,530,741 A | 6/1996 | Rubin |
| 5,533,106 A | 7/1996 | Blumhardt |
| 5,535,265 A | 7/1996 | Suwandhaputra |
| 5,537,470 A | 7/1996 | Lee |
| 5,539,809 A | 7/1996 | Mayer |
| 5,546,447 A | 8/1996 | Skarbo et al. |
| 5,550,900 A | 8/1996 | Ensor et al. |
| 5,550,905 A | 8/1996 | Silverman |
| 5,563,935 A | 10/1996 | Small |
| 5,563,936 A | 10/1996 | Washington |
| 5,602,908 A | 2/1997 | Fan |
| 5,608,788 A | 3/1997 | Demlow et al. |
| 5,619,561 A | 4/1997 | Reese |
| 5,631,950 A | 5/1997 | Brown |
| 5,636,269 A | 6/1997 | Eisdorfer |
| 5,644,629 A | 7/1997 | Chow |
| 5,646,979 A | 7/1997 | Knuth |
| 5,657,372 A | 8/1997 | Ahlberg et al. |
| D383,466 S | 9/1997 | Burrell et al. |
| 5,668,852 A | 9/1997 | Holmes |
| 5,696,809 A | 12/1997 | Voit |
| 5,696,815 A | 12/1997 | Smyk |
| 5,699,413 A | 12/1997 | Sridhar |
| 5,699,523 A | 12/1997 | Li et al. |
| 5,701,301 A | 12/1997 | Weisser, Jr. |
| 5,703,934 A | 12/1997 | Zicker et al. |
| 5,703,943 A | 12/1997 | Otto |
| H1714 H | 3/1998 | Partridge, III |
| 5,724,412 A | 3/1998 | Srinivasan |
| 5,734,706 A | 3/1998 | Windsor et al. |
| 5,742,668 A | 4/1998 | Pepe et al. |
| 5,742,905 A | 4/1998 | Pepe et al. |
| 5,754,635 A | 5/1998 | Kim |
| 5,754,636 A | 5/1998 | Bayless et al. |
| 5,754,775 A | 5/1998 | Adamson et al. |
| 5,771,281 A | 6/1998 | Batten, Jr. |
| 5,771,283 A | 6/1998 | Chang et al. |
| 5,781,621 A | 7/1998 | Lim et al. |
| 5,784,444 A | 7/1998 | Snyder et al. |
| 5,796,806 A | 8/1998 | Birckbichler |
| 5,799,072 A | 8/1998 | Vulcan et al. |
| 5,802,160 A | 9/1998 | Kugell et al. |
| 5,802,251 A | 9/1998 | Cohen et al. |
| 5,805,587 A | 9/1998 | Norris et al. |
| 5,805,682 A | 9/1998 | Voit et al. |
| 5,805,997 A | 9/1998 | Farris |
| 5,809,128 A | 9/1998 | McMullin |
| 5,812,533 A | 9/1998 | Cox et al. |
| 5,812,649 A | 9/1998 | Shen |
| 5,838,774 A | 11/1998 | Weisser, Jr. |
| 5,841,838 A | 11/1998 | Itoh et al. |
| 5,841,850 A | 11/1998 | Fan |
| 5,848,142 A | 12/1998 | Yaker |
| 5,850,435 A | 12/1998 | Devillier |
| 5,850,436 A | 12/1998 | Rosen et al. |
| 5,857,017 A | 1/1999 | Ohi |
| 5,859,903 A | 1/1999 | Lee |
| 5,872,834 A | 2/1999 | Teitelbaum |
| 5,872,934 A | 2/1999 | Whitehouse et al. |
| 5,875,239 A | 2/1999 | Koralewski et al. |
| 5,875,241 A | 2/1999 | Chang et al. |
| 5,878,036 A | 3/1999 | Spartz et al. |
| 5,883,942 A | 3/1999 | Lim et al. |
| 5,884,144 A | 3/1999 | Chavez, Jr. et al. |
| 5,894,504 A | 4/1999 | Alfred et al. |
| 5,901,209 A | 5/1999 | Tannenbaum et al. |
| 5,901,212 A | 5/1999 | True et al. |
| 5,903,636 A | 5/1999 | Malik |
| 5,905,794 A | 5/1999 | Gunn et al. |
| 5,907,596 A | 5/1999 | Karnowski |
| 5,907,604 A | 5/1999 | Hsu |
| 5,915,000 A | 6/1999 | Nguyen et al. |
| 5,917,817 A | 6/1999 | Dunn et al. |
| 5,918,213 A | 6/1999 | Bernard et al. |
| 5,923,744 A | 7/1999 | Cheng et al. |
| 5,930,701 A | 7/1999 | Skog |
| 5,940,484 A | 8/1999 | DeFazio et al. |
| 5,943,416 A | 8/1999 | Gisby |
| 5,946,363 A | 8/1999 | Rominger et al. |
| 5,946,636 A | 8/1999 | Uyeno et al. |
| 5,946,684 A | 8/1999 | Lund |
| D413,605 S | 9/1999 | Thomas et al. |
| 5,948,040 A | 9/1999 | DeLorme et al. |
| 5,948,061 A | 9/1999 | Merriman et al. |
| 5,949,865 A | 9/1999 | Fusinato |
| 5,953,399 A | 9/1999 | Farris et al. |
| 5,953,657 A | 9/1999 | Ghisler |
| 5,963,626 A | 10/1999 | Nabkel |
| 5,969,647 A | 10/1999 | Mou et al. |
| 5,970,127 A | 10/1999 | Smith et al. |
| 5,970,128 A | 10/1999 | Kim |
| 5,974,309 A | 10/1999 | Foti |
| 5,982,866 A | 11/1999 | Kowalski |
| 5,991,377 A | 11/1999 | Malik |
| 5,999,207 A | 12/1999 | Rodriguez et al. |
| 5,999,599 A | 12/1999 | Shaffer et al. |
| 5,999,613 A | 12/1999 | Nabkel et al. |
| 6,005,870 A | 12/1999 | Leung et al. |
| 6,006,087 A | 12/1999 | Amin |
| 6,009,321 A | 12/1999 | Wang et al. |
| 6,014,559 A | 1/2000 | Amin |
| 6,016,512 A | 1/2000 | Huitema |
| 6,021,188 A | 2/2000 | Meg |
| 6,021,427 A | 2/2000 | Spagna et al. |
| 6,031,899 A | 2/2000 | Wu |
| 6,044,148 A | 3/2000 | Bleile |
| 6,049,291 A | 4/2000 | Kikinis |
| 6,058,171 A | 5/2000 | Hoopes |

| | | | |
|---|---|---|---|
| 6,061,434 A | 5/2000 | Corbett | |
| 6,061,566 A | 5/2000 | Friman | |
| 6,064,876 A | 5/2000 | Ishida et al. | |
| 6,065,844 A | 5/2000 | Chen | |
| 6,072,859 A | 6/2000 | Kong | |
| 6,078,581 A | 6/2000 | Shtivelman et al. | |
| 6,091,947 A | 7/2000 | Sumner et al. | |
| 6,094,478 A | 7/2000 | Shepherd et al. | |
| 6,094,573 A | 7/2000 | Heinonen et al. | |
| 6,094,574 A | 7/2000 | Vance et al. | |
| 6,094,575 A | 7/2000 | Anderson et al. | |
| 6,101,246 A | 8/2000 | Heinmiller et al. | |
| 6,104,784 A | 8/2000 | Robbins et al. | |
| 6,104,800 A | 8/2000 | Benson | |
| 6,108,630 A | 8/2000 | Kuechler et al. | |
| 6,111,939 A | 8/2000 | Brabanec | |
| 6,134,235 A | 10/2000 | Goldman et al. | |
| 6,134,311 A | 10/2000 | Ekstrom | |
| 6,137,870 A | 10/2000 | Scherer | |
| 6,137,871 A | 10/2000 | Maier et al. | |
| 6,141,341 A | 10/2000 | Jones et al. | |
| 6,141,409 A | 10/2000 | Madoch et al. | |
| 6,144,644 A | 11/2000 | Bajzath et al. | |
| 6,154,531 A | 11/2000 | Clapper | |
| 6,160,876 A | 12/2000 | Moss et al. | |
| 6,161,021 A | 12/2000 | Akpa | |
| 6,163,595 A | 12/2000 | Parker et al. | |
| 6,163,607 A | 12/2000 | Bogart et al. | |
| 6,163,691 A | 12/2000 | Buettner et al. | |
| 6,167,254 A | 12/2000 | Chavez, Jr. et al. | |
| 6,169,911 B1 | 1/2001 | Wagner et al. | |
| 6,173,049 B1 | 1/2001 | Malik | |
| 6,178,232 B1 | 1/2001 | Latter et al. | |
| 6,181,928 B1 | 1/2001 | Moon | |
| D437,879 S | 2/2001 | Weinandt | |
| 6,185,289 B1 | 2/2001 | Hetz et al. | |
| 6,185,426 B1 | 2/2001 | Alperovich | |
| 6,192,115 B1 | 2/2001 | Toy et al. | |
| 6,192,116 B1 | 2/2001 | Mayak | |
| 6,198,480 B1 | 3/2001 | Cotugno et al. | |
| 6,198,920 B1 | 3/2001 | Doviak et al. | |
| 6,202,023 B1 | 3/2001 | Hancock et al. | |
| 6,219,407 B1 | 4/2001 | Kanevsky et al. | |
| 6,219,413 B1 | 4/2001 | Burg | |
| 6,222,826 B1 | 4/2001 | Faynberg et al. | |
| 6,226,367 B1 | 5/2001 | Smith et al. | |
| 6,226,369 B1 | 5/2001 | Lim et al. | |
| 6,226,399 B1 | 5/2001 | Robinson | |
| 6,229,883 B1 | 5/2001 | Kakizaki et al. | |
| 6,230,006 B1 | 5/2001 | Keenan et al. | |
| 6,233,325 B1 | 5/2001 | Frech et al. | |
| 6,236,975 B1 | 5/2001 | Boe et al. | |
| 6,243,448 B1 | 6/2001 | Corbett et al. | |
| 6,243,461 B1 | 6/2001 | Hwang et al. | |
| 6,246,976 B1 | 6/2001 | Mukaigawa et al. | |
| 6,252,952 B1 | 6/2001 | Kung et al. | |
| 6,256,671 B1 | 7/2001 | Strentzsch et al. | |
| 6,262,987 B1 | 7/2001 | Mogul | |
| 6,266,399 B1 | 7/2001 | Weller et al. | |
| 6,278,704 B1 | 8/2001 | Creamer et al. | |
| 6,278,862 B1 | 8/2001 | Henderson | |
| 6,282,275 B1 | 8/2001 | Gurbani et al. | |
| 6,292,479 B1 | 9/2001 | Bartholomew et al. | |
| 6,292,549 B1 | 9/2001 | Lung et al. | |
| 6,295,502 B1 | 9/2001 | Hancock et al. | |
| 6,301,342 B1 | 10/2001 | Ander et al. | |
| 6,301,350 B1 | 10/2001 | Henningson et al. | |
| 6,304,644 B2 | 10/2001 | Karnowski | |
| 6,310,943 B1 | 10/2001 | Kowakski | |
| 6,311,057 B1 | 10/2001 | Barvesten | |
| 6,317,488 B1 | 11/2001 | DePond et al. | |
| 6,317,781 B1 | 11/2001 | De Boor et al. | |
| 6,324,263 B1 | 11/2001 | Sherwood et al. | |
| 6,324,271 B1 | 11/2001 | Sawyer et al. | |
| 6,327,347 B1 | 12/2001 | Gutzmann | |
| 6,332,021 B2 | 12/2001 | Latter et al. | |
| 6,333,973 B1 | 12/2001 | Smith et al. | |
| 6,337,904 B1 | 1/2002 | Gisby | |
| 6,337,979 B1 | 1/2002 | Nakayasu | |
| 6,339,639 B1 | 1/2002 | Henderson | |
| 6,341,161 B1 | 1/2002 | Latter et al. | |
| 6,345,187 B1 | 2/2002 | Berthoud et al. | |
| 6,347,136 B1 | 2/2002 | Horan | |
| 6,351,637 B1 | 2/2002 | Lee | |
| 6,353,664 B1 | 3/2002 | Cannon et al. | |
| 6,361,637 B2 | 3/2002 | Martin et al. | |
| 6,363,140 B1 | 3/2002 | Pinard | |
| 6,363,411 B1 | 3/2002 | Dugan et al. | |
| 6,363,664 B1 | 4/2002 | Brutsaert | |
| 6,366,661 B1 | 4/2002 | Devillier et al. | |
| 6,366,772 B1 | 4/2002 | Arnson | |
| 6,377,807 B1 | 4/2002 | Iparrea et al. | |
| 6,377,979 B1 | 4/2002 | Yamashita et al. | |
| 6,389,124 B1 | 5/2002 | Schnarel et al. | |
| 6,389,132 B1 | 5/2002 | Price | |
| 6,400,809 B1 | 6/2002 | Bossemeyer, Jr. et al. | |
| 6,400,947 B1 | 6/2002 | Bright et al. | |
| 6,404,868 B1 | 6/2002 | Beamish et al. | |
| 6,404,875 B2 | 6/2002 | Malik et al. | |
| 6,411,692 B1 | 6/2002 | Scherer | |
| 6,421,425 B1 | 7/2002 | Bossi et al. | |
| 6,422,263 B1 | 7/2002 | Spicer | |
| 6,427,003 B1 | 7/2002 | Corbett et al. | |
| 6,427,064 B1 | 7/2002 | Henderson | |
| 6,434,394 B1 | 8/2002 | Grundvig et al. | |
| 6,437,879 B1 | 8/2002 | Temple | |
| 6,438,216 B1 | 8/2002 | Aktas | |
| 6,438,217 B1 | 8/2002 | Huna | |
| 6,438,584 B1 | 8/2002 | Powers | |
| 6,442,249 B1 | 8/2002 | Miller, Jr. | |
| 6,442,262 B1 | 8/2002 | Moss et al. | |
| 6,442,263 B1 | 8/2002 | Beaton et al. | |
| 6,442,283 B1 | 8/2002 | Tewfik et al. | |
| 6,445,781 B1 | 9/2002 | Heinmiller et al. | |
| 6,449,351 B1 | 9/2002 | Moss et al. | |
| 6,449,361 B1 | 9/2002 | Okuda | |
| 6,462,646 B2 | 10/2002 | Helferich | |
| 6,466,653 B1 | 10/2002 | Hamrick et al. | |
| 6,477,246 B1 | 11/2002 | Dolan et al. | |
| 6,480,589 B1 | 11/2002 | Lee et al. | |
| 6,483,898 B2 | 11/2002 | Lew et al. | |
| 6,493,430 B2 | 12/2002 | Leuca et al. | |
| 6,493,431 B1 | 12/2002 | Troen-Krasnow et al. | |
| 6,493,437 B1 | 12/2002 | Olshansky | |
| 6,493,439 B2 | 12/2002 | Lung et al. | |
| 6,494,953 B2 | 12/2002 | Hayes et al. | |
| 6,496,569 B2 | 12/2002 | Pelletier et al. | |
| 6,496,571 B1 | 12/2002 | Wilson | |
| 6,496,692 B1 | 12/2002 | Shanahan | |
| 6,498,841 B2 | 12/2002 | Bull et al. | |
| 6,507,737 B1 | 1/2003 | Laham et al. | |
| 6,529,500 B1 | 3/2003 | Pandharipande | |
| 6,529,591 B1 | 3/2003 | Dosani et al. | |
| 6,532,490 B1 | 3/2003 | Lewis et al. | |
| 6,539,080 B1 | 3/2003 | Bruce et al. | |
| 6,542,583 B1 | 4/2003 | Taylor | |
| 6,542,586 B1 | 4/2003 | Helstab | |
| 6,542,591 B1 | 4/2003 | Amro et al. | |
| 6,542,602 B1 | 4/2003 | Elazar | |
| 6,542,812 B1 | 4/2003 | Obradovich et al. | |
| 6,546,092 B2 | 4/2003 | Corbett et al. | |
| 6,549,621 B1 | 4/2003 | Christie, IV et al. | |
| 6,553,110 B1 | 4/2003 | Peng | |
| 6,553,221 B2 | 4/2003 | Nakamura et al. | |
| 6,556,540 B1 | 4/2003 | Mawhinney et al. | |
| 6,560,317 B1 | 5/2003 | Quagliana | |
| 6,560,327 B1 | 5/2003 | McConnell | |
| 6,566,995 B2 | 5/2003 | Furuuchi et al. | |
| 6,570,971 B2 | 5/2003 | Latter et al. | |
| 6,570,974 B1 | 5/2003 | Gerszberg et al. | |
| 6,574,319 B2 | 6/2003 | Latter et al. | |
| 6,580,904 B2 | 6/2003 | Cox et al. | |
| 6,584,490 B1 | 6/2003 | Schuster et al. | |
| 6,587,458 B1 | 7/2003 | Burg et al. | |
| 6,590,970 B1 | 7/2003 | Cai et al. | |
| 6,597,905 B1 | 7/2003 | Hijii | |
| 6,603,840 B2 | 8/2003 | Fellingham et al. | |
| 6,603,854 B1 | 8/2003 | Judkins et al. | |

| Patent No. | Date | Name |
|---|---|---|
| 6,608,891 B1 | 8/2003 | Pelletier et al. |
| 6,618,474 B1 | 9/2003 | Reese |
| 6,625,595 B1 | 9/2003 | Anderson et al. |
| 6,631,181 B1 | 10/2003 | Bates et al. |
| 6,633,633 B1 | 10/2003 | Bedingfield |
| 6,639,979 B1 | 10/2003 | Kim |
| 6,650,743 B1 | 11/2003 | Heinmiller et al. |
| 6,659,597 B2 | 12/2003 | Murata et al. |
| 6,661,785 B1 | 12/2003 | Zhang et al. |
| 6,665,378 B1 | 12/2003 | Spielman et al. |
| 6,665,388 B2 | 12/2003 | Bedingfield |
| 6,665,715 B1 | 12/2003 | Houri |
| 6,675,008 B1 | 1/2004 | Paik et al. |
| 6,677,894 B2 | 1/2004 | Sheynblat et al. |
| 6,683,870 B1 | 1/2004 | Archer |
| 6,687,341 B1 | 2/2004 | Koch et al. |
| 6,697,357 B2 | 2/2004 | Emerson, III |
| 6,701,160 B1 | 3/2004 | Pinder et al. |
| 6,714,519 B2 | 3/2004 | Luzzatti et al. |
| 6,718,021 B2 | 4/2004 | Crockett et al. |
| 6,721,407 B1 | 4/2004 | Michelena |
| 6,724,872 B1 | 4/2004 | Moore et al. |
| 6,725,872 B2 | 4/2004 | Kindell et al. |
| 6,728,355 B2 | 4/2004 | Kowalski |
| 6,728,360 B1 | 4/2004 | Brennan |
| 6,728,365 B1 | 4/2004 | Li et al. |
| 6,731,727 B2 | 5/2004 | Corbett et al. |
| 6,732,188 B1 | 5/2004 | Flockhart et al. |
| 6,738,615 B1 | 5/2004 | Chow et al. |
| 6,751,457 B1 | 6/2004 | Martin |
| 6,757,274 B1 | 6/2004 | Bedingfield et al. |
| 6,757,530 B2 | 6/2004 | Rouse et al. |
| 6,757,732 B1 | 6/2004 | Sollee et al. |
| 6,757,740 B1 | 6/2004 | Parekh et al. |
| 6,760,413 B2 | 7/2004 | Cannon et al. |
| 6,765,998 B2 | 7/2004 | Bruce et al. |
| D494,953 S | 8/2004 | Leung |
| 6,771,755 B1 | 8/2004 | Simpson |
| 6,771,956 B1 | 8/2004 | Beeler |
| 6,775,366 B1 | 8/2004 | Cobbett et al. |
| 6,775,371 B2 | 8/2004 | Elsey et al. |
| 6,775,540 B2 | 8/2004 | Iyer |
| 6,778,524 B1 | 8/2004 | Augart |
| 6,779,020 B1 | 8/2004 | Henrick |
| 6,785,301 B1 | 8/2004 | Chapman et al. |
| 6,785,368 B1 | 8/2004 | Eason et al. |
| 6,785,540 B1 | 8/2004 | Wichelman |
| 6,792,266 B1 | 9/2004 | Masuda et al. |
| 6,798,841 B2 | 9/2004 | Hansen |
| 6,798,876 B1 | 9/2004 | Bala |
| 6,798,879 B1 | 9/2004 | Beham |
| 6,804,503 B2 | 10/2004 | Shohara et al. |
| 6,807,267 B2 | 10/2004 | Moss et al. |
| 6,810,077 B1 | 10/2004 | Dezonno |
| 6,810,115 B2 | 10/2004 | Fukuda |
| 6,813,344 B1 | 11/2004 | Lemke |
| 6,816,481 B1 | 11/2004 | Adams et al. |
| 6,818,474 B2 | 11/2004 | Kim et al. |
| 6,826,270 B1 | 11/2004 | Welch et al. |
| 6,826,271 B1 | 11/2004 | Kanabar et al. |
| 6,826,617 B1 | 11/2004 | Ansell et al. |
| 6,829,348 B1 | 12/2004 | Schroeder et al. |
| 6,830,595 B2 | 12/2004 | Reynolds, III |
| 6,831,974 B1 | 12/2004 | Watson et al. |
| 6,842,512 B2 | 1/2005 | Pedersen |
| 6,845,151 B2 | 1/2005 | Peng |
| 6,845,512 B2 | 1/2005 | Horng et al. |
| 6,853,710 B2 | 2/2005 | Harris |
| 6,853,711 B2 | 2/2005 | Brisebois et al. |
| 6,856,677 B2 | 2/2005 | Leijonhufvud |
| 6,859,527 B1 | 2/2005 | Banks et al. |
| 6,865,266 B1 | 3/2005 | Pershan |
| 6,865,384 B2 | 3/2005 | Sagi et al. |
| 6,868,155 B1 | 3/2005 | Cannon et al. |
| 6,870,924 B1 | 3/2005 | Ukon |
| 6,871,076 B2 | 3/2005 | Samn |
| 6,888,927 B1 | 5/2005 | Cruickshank et al. |
| 6,888,972 B2 | 5/2005 | Berg et al. |
| 6,891,940 B1 | 5/2005 | Bhandari et al. |
| 6,898,275 B2 | 5/2005 | Dolan et al. |
| 6,904,137 B2 | 6/2005 | Brandt et al. |
| 6,904,276 B1 | 6/2005 | Freeman et al. |
| 6,907,034 B1 | 6/2005 | Begis |
| 6,909,777 B2 | 6/2005 | Latter et al. |
| 6,914,953 B2 | 7/2005 | Boerstler |
| 6,917,960 B1 | 7/2005 | Decasper et al. |
| 6,922,411 B1 | 7/2005 | Taylor |
| 6,928,154 B1 | 8/2005 | Cheaito et al. |
| 6,931,007 B2 | 8/2005 | Jones |
| 6,947,531 B1 | 9/2005 | Lewis et al. |
| 6,952,469 B2 | 10/2005 | Han |
| 6,970,546 B2 | 11/2005 | Kent, Jr. et al. |
| 6,977,993 B2 | 12/2005 | Starbuck et al. |
| 6,996,211 B2 | 2/2006 | Reynolds et al. |
| 7,012,999 B2 | 3/2006 | Ruckart |
| 7,016,482 B2 | 3/2006 | Moss et al. |
| 7,020,250 B2 | 3/2006 | Lew et al. |
| 7,027,408 B2 | 4/2006 | Nabkel et al. |
| 7,027,569 B2 | 4/2006 | Price |
| 7,076,051 B2 | 7/2006 | Brown et al. |
| 7,079,837 B1 | 7/2006 | Sherman et al. |
| 7,085,257 B1 | 8/2006 | Karves et al. |
| 7,085,358 B2 | 8/2006 | Ruckart et al. |
| 7,085,578 B2 | 8/2006 | Barclay et al. |
| 7,095,715 B2 | 8/2006 | Buckman et al. |
| 7,097,169 B2 | 8/2006 | Mueller |
| 7,103,167 B2 | 9/2006 | Brahm et al. |
| 7,103,662 B2 | 9/2006 | Ray et al. |
| 7,107,077 B2 | 9/2006 | Lee |
| 7,113,577 B2 | 9/2006 | Cook et al. |
| 7,127,488 B1 | 10/2006 | Scott et al. |
| 7,139,374 B1 | 11/2006 | Scott et al. |
| 7,152,118 B2 | 12/2006 | Anderson, IV et al. |
| 7,155,211 B2 | 12/2006 | Mun et al. |
| 7,184,533 B1 | 2/2007 | Shaffer et al. |
| 7,200,673 B1 | 4/2007 | Augart |
| 7,215,750 B2 | 5/2007 | Nguyen et al. |
| 7,228,129 B1 | 6/2007 | Ward et al. |
| 7,254,226 B1 | 8/2007 | Roberts et al. |
| 7,257,210 B1 | 8/2007 | Henderson |
| 7,313,227 B2 | 12/2007 | Jones |
| 7,315,614 B2 | 1/2008 | Bedingfield, Sr. et al. |
| 7,386,319 B2 | 6/2008 | Rogalski et al. |
| 7,403,768 B2 | 7/2008 | Bedingfield, Sr. et al. |
| 7,418,096 B2 | 8/2008 | Moton et al. |
| 7,443,964 B2 | 10/2008 | Urban et al. |
| 7,613,810 B2 | 11/2009 | Romero et al. |
| 7,623,645 B1 | 11/2009 | Scott et al. |
| 7,631,047 B1 | 12/2009 | Adamczyk et al. |
| 7,653,191 B1 | 1/2010 | Glasser et al. |
| 7,672,444 B2 | 3/2010 | Perrella et al. |
| 2001/0002209 A1 | 5/2001 | Han |
| 2001/0005854 A1 | 6/2001 | Murata et al. |
| 2001/0006519 A1 | 7/2001 | Voit |
| 2001/0036174 A1 | 11/2001 | Herring |
| 2001/0044898 A1 | 11/2001 | Benussi et al. |
| 2001/0048737 A1 | 12/2001 | Goldberg et al. |
| 2002/0007400 A1 | 1/2002 | Pedersen |
| 2002/0009184 A1 | 1/2002 | Shnier |
| 2002/0012426 A1* | 1/2002 | Gupton .................. 379/210.02 |
| 2002/0016748 A1 | 2/2002 | Emodi et al. |
| 2002/0023265 A1 | 2/2002 | Metcalf |
| 2002/0041605 A1 | 4/2002 | Benussi et al. |
| 2002/0055926 A1 | 5/2002 | Dan et al. |
| 2002/0067816 A1 | 6/2002 | Bushnell |
| 2002/0077102 A1 | 6/2002 | Achuthan et al. |
| 2002/0082050 A1 | 6/2002 | Mountney et al. |
| 2002/0085687 A1 | 7/2002 | Contractor et al. |
| 2002/0091777 A1 | 7/2002 | Schwartz |
| 2002/0118812 A1 | 8/2002 | Contractor |
| 2002/0119430 A1 | 8/2002 | Szynalski |
| 2002/0120629 A1 | 8/2002 | Leonard |
| 2002/0122401 A1 | 9/2002 | Xiang et al. |
| 2002/0125929 A1 | 9/2002 | Chen et al. |
| 2002/0128033 A1 | 9/2002 | Burgess |
| 2002/0136381 A1 | 9/2002 | Shaffer et al. |
| 2002/0171581 A1 | 11/2002 | Sheynblat et al. |
| 2002/0172338 A1 | 11/2002 | Lee et al. |

| | | | |
|---|---|---|---|
| 2002/0176563 A1 | 11/2002 | Kryvossidis et al. | |
| 2002/0183098 A1 | 12/2002 | Lee et al. | |
| 2002/0188443 A1 | 12/2002 | Reddy et al. | |
| 2002/0197991 A1 | 12/2002 | Anvekar et al. | |
| 2003/0002633 A1 | 1/2003 | Kredo et al. | |
| 2003/0006912 A1 | 1/2003 | Brescia | |
| 2003/0012353 A1 | 1/2003 | Tang et al. | |
| 2003/0016143 A1 | 1/2003 | Ghazarian | |
| 2003/0016800 A1 | 1/2003 | Fukuda | |
| 2003/0021290 A1 | 1/2003 | Jones | |
| 2003/0026416 A1 | 2/2003 | Fusco | |
| 2003/0032414 A1 | 2/2003 | Melaku et al. | |
| 2003/0043974 A1 | 3/2003 | Emerson, III | |
| 2003/0050100 A1 | 3/2003 | Dent | |
| 2003/0053602 A1 | 3/2003 | Stuckman et al. | |
| 2003/0063730 A1 | 4/2003 | Woodring | |
| 2003/0063731 A1 | 4/2003 | Woodring | |
| 2003/0065776 A1 | 4/2003 | Malik et al. | |
| 2003/0068020 A1 | 4/2003 | Hamrick et al. | |
| 2003/0092384 A1 | 5/2003 | Ross, III | |
| 2003/0092432 A1 | 5/2003 | Hwang | |
| 2003/0095650 A1 | 5/2003 | Mize | |
| 2003/0096581 A1 | 5/2003 | Takamine | |
| 2003/0103608 A1 | 6/2003 | Pearson et al. | |
| 2003/0112938 A1 | 6/2003 | Kanakubo et al. | |
| 2003/0119522 A1 | 6/2003 | Barclay et al. | |
| 2003/0133543 A1 | 7/2003 | Khakoo et al. | |
| 2003/0133553 A1 | 7/2003 | Khakoo et al. | |
| 2003/0133653 A1 | 7/2003 | Barros et al. | |
| 2003/0135562 A1 | 7/2003 | Himmel et al. | |
| 2003/0148758 A1 | 8/2003 | McMullin | |
| 2003/0152207 A1 | 8/2003 | Ryan | |
| 2003/0187949 A1 | 10/2003 | Bhatt et al. | |
| 2003/0193967 A1 | 10/2003 | Fenton et al. | |
| 2003/0196206 A1 | 10/2003 | Shusman | |
| 2003/0198322 A1 | 10/2003 | White, Jr. | |
| 2003/0215070 A1 | 11/2003 | Akhteruzzaman et al. | |
| 2003/0219107 A1 | 11/2003 | Richardson et al. | |
| 2004/0049545 A1 | 3/2004 | Lockridge et al. | |
| 2004/0101118 A1 | 5/2004 | Powell | |
| 2004/0101124 A1 | 5/2004 | Koch et al. | |
| 2004/0109558 A1 | 6/2004 | Koch | |
| 2004/0114603 A1 | 6/2004 | Suhail et al. | |
| 2004/0114730 A1 | 6/2004 | Koch et al. | |
| 2004/0120475 A1 | 6/2004 | Bauer et al. | |
| 2004/0125929 A1 | 7/2004 | Pope | |
| 2004/0171370 A1 | 9/2004 | Natarajan | |
| 2004/0181587 A1 | 9/2004 | Cao et al. | |
| 2004/0202298 A1 | 10/2004 | Lopez et al. | |
| 2004/0202299 A1 | 10/2004 | Schwartz | |
| 2004/0208301 A1 | 10/2004 | Urban et al. | |
| 2004/0208302 A1 | 10/2004 | Urban et al. | |
| 2004/0209604 A1 | 10/2004 | Urban et al. | |
| 2004/0209605 A1 | 10/2004 | Urban et al. | |
| 2004/0209640 A1 | 10/2004 | Urban et al. | |
| 2004/0213207 A1 | 10/2004 | Silver et al. | |
| 2004/0213396 A1* | 10/2004 | MacNamara et al. | ... 379/210.02 |
| 2004/0218743 A1* | 11/2004 | Hussain et al. | ... 379/201.11 |
| 2004/0233892 A1 | 11/2004 | Roberts et al. | |
| 2004/0242212 A1 | 12/2004 | Bacon et al. | |
| 2004/0248560 A1 | 12/2004 | Bedingfield, Sr. | |
| 2005/0068166 A1 | 3/2005 | Baker | |
| 2005/0073999 A1 | 4/2005 | Koch | |
| 2005/0100158 A1 | 5/2005 | Kreiner et al. | |
| 2005/0107074 A1 | 5/2005 | Zellner | |
| 2005/0147228 A1 | 7/2005 | Perrella et al. | |
| 2005/0157861 A1 | 7/2005 | Bossemeyer et al. | |
| 2006/0002540 A1 | 1/2006 | Kreiner et al. | |
| 2006/0013375 A1 | 1/2006 | Smith et al. | |
| 2006/0029209 A1 | 2/2006 | Moton et al. | |
| 2006/0062374 A1 | 3/2006 | Gupta | |
| 2006/0152207 A1 | 7/2006 | Riebel et al. | |
| 2006/0153173 A1 | 7/2006 | Beck et al. | |
| 2006/0270392 A1 | 11/2006 | Scott et al. | |
| 2007/0064911 A1 | 3/2007 | Bedingfield, Sr. et al. | |
| 2007/0121825 A1 | 5/2007 | Walsh et al. | |

FOREIGN PATENT DOCUMENTS

| | | |
|---|---|---|
| KR | 2002014945 | 2/2002 |
| WO | 97/50225 | 12/1997 |
| WO | 03/030501 A1 | 4/2003 |
| WO | 03/030502 A1 | 4/2003 |
| WO | 03/090432 A1 | 10/2003 |

OTHER PUBLICATIONS

Address Allocation for Private Internets, Rekhter et al., pp. 1-8, Feb. 1996.

Bellcore Specification TR-NWT-000310, Calling Number Delivery, Issue 4, Dec. 1992.

Bellcore Specification TR-NWT-001188, Calling Name Delivery Generic Requirements, Issue 1, Dec. 1991.

T. Farley et al.; "Cellular Telephone Basics: AMPS & Beyond;" [online]; [retrieved on Mar. 6, 2003]; retrieved from the Internet http://www.privateline.com/Cellbasics/Cellbasics.html.

J. Boswell, G. Lingenauber, An Advanced HF Receiver Design, Jul. 1994, IEE, Conference Publication. No. 392, pp. 41-47.

Mark H. Norris, Transmitter Architectures, 1998, IEE, pp. 4/1-4/6.

OKI Silicon Solutions Company, Japan Site, "Multi-Lingual Text-to-Speech Processor ML2110;" [online]; [retrieved on Aug. 31, 2005] retrieved from the Internet http://www.//oki.com/semi/English/ml2110/htm.

RBS 884 Pico System Description, Author Unknown, Ericsson 1/1551-AE/LZB 119 2269 Uae Rev A, Apr. 23, 1998.

SIP: Session Initiation Protocol, Handley et al., Mar. 1999.

Slawson, "Caller ID Basics;" [online]; [retrieved on Oct. 31, 2001]; retrieved from the Internet http://www.testmark.com/develop/tml_callerid_cnt.html.

SmartHome "The Caller ID System that Speaks for Itself!;" [online]; [retrieved on Aug. 31, 2005]; retrieved from the Internet http://www.smarthome.com/5154.html.

SmartHome "The Caller Id System that SPEAKS of Itself! Talking Caller ID;" [online]; [retrieved on Nov. 5, 2001]; retrieved from the Internet http://www.smarthome.com/5154.html.

"Talking Caller ID by Stealth Software;" [online]; [retrieved on Nov. 5, 2001]; retrieved from the Internet http://www.talkingcallerid.com/.

The IP Network Address Translator (NAT), Egevang et al., May 1994.

"Time Division Multiple Access (TDMA);" [online]; [retrieved on Mar. 6, 2003]; retrieved from the Internet http://www.iec.org/online/tutorials/tdma/.

"Venture IP Telephone System" AASTRA [online]; [retrieved on Aug. 31, 2001]; retrieved from the Internet http://www.aastra.com/products/callerids/voicecallerid/be-6060.html.

"Venture IP Telephone System" AASTRA; [online]; [retrieved on Nov. 5, 2001]; retrieved from the Internet http://www.aastra.com/products/callerids/voicecallerid/be-6090.html.

"Voice-9090"Talking Caller ID, Aastra Telecom-Talking Caller ID-Voice 9090, [online]; [retrieved on Nov. 5, 2001]; http://www.aastra.com/products/callerids/voicecallerid/be-9090.html.

International Search Report PCT/US02/30068, Dec. 9, 2002.

International Search Report PCT/US02/29988, Sep. 23, 2002.

U.S. Appl. No. 10/032,724, filed Dec. 27, 2001 Harold et al.

U.S. Appl. No. 10/200,906, filed Jul. 23, 2002 Scott et al.

U.S. Appl. No. 10/144,555, filed May 13, 2002 Koch et al.

U.S. Appl. No. 10/144,556, filed May 13, 2002 Koch et al.

U.S. Appl. No. 10/152,544, filed May 21, 2002 Alston et al.

U.S. Appl. No. 10/200,874, filed Jul. 23, 2002 Scott et al.

U.S. Appl. No. 09/812,338, filed Mar. 19, 2001 Smith.

* cited by examiner

PROGRAMMABLE CALLER ID

CROSS REFERENCE TO RELATED APPLICATIONS

This application relates to applicants' co-pending application entitled "Key Word Programmable Caller ID," Ser. No. 11/894,905 filed simultaneously herewith and of which is incorporated herein by this reference.

This application relates to applicants' co-pending U.S. patent application Ser. No. 11/390,768, entitled "Privacy Screening Services," filed on Mar. 28, 2006, and of which is incorporated herein by this reference.

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The exemplary embodiments relate to the field of telephony and of computers and, more particularly, to methods and systems for providing communications screening services.

Communications has experienced explosive growth, and more growth is planned as communication access and numerous communications devices improve. This explosive growth is revolutionizing special services offered to subscribing customers. Of the special service offerings, the most relevant to this invention is the caller identification or Caller ID services. A customer or a user of a telephone (or alternate communications device) that is served by the Caller ID service is provided with a calling party's directory information. Presently available Caller ID systems provide the calling party's telephone number and a billing name associated with the calling party's telephone number (if available) when an incoming communicationer line identification (ICLID) signal can be detected, decoded, and transmitted to the called telephone or other display device associated with the called telephone (e.g., a Caller ID device). The Caller ID services also allow a receiving party to receive directory information for other incoming communications while the receiving party's phone is used (e.g., during a conversation with another party); this service is sometimes referred to as Caller ID communication Waiting service. A customer may use the Caller ID information to make a decision whether to answer and/or to prepare for the incoming communication.

In addition, the customer may use Caller ID information to block incoming communications associated with one or more ICLID signals including specific telephone numbers selected by the customer and/or privacy screening services for unidentifiable telephone numbers of incoming communications (e.g., telemarketers). If the customer wants to selectively answer incoming communications using Caller ID information, the customer has several choices—block the communication or ignore the ringing (or other audible alerts) until the communication is processed by a voice messaging system (or other communication handling system) or until the caller hangs up. If the communication is blocked, then the customer may not have immediate notification of the incoming blocked communication to re-evaluate whether to accept the communication since circumstances for accepting the communication may change. If the customer ignores the communication and listens to unwanted ringing, then the customer may be annoyed with the repetitive noise alerting the customer of the call. In recent years, telephony providers and manufacturers have tried to provide alternate systems and methods to alert the customer of selective incoming communications that minimizes interruptions for unwanted calls.

Companies and governments are trying to prevent or otherwise filter telemarketing calls. Nearly everyone has experienced an annoying telemarketing call, and every year many people are defrauded by telemarketers. Many products, such as the TELEZAPPER™, attempt to reduce telemarketing calls (TELEZAPPER is a trademark of the Royal Appliance Manufacturing Company, www.royalappliance.com). The United States Federal Trade Commission and many state governments have created "Do Not Call" lists/registries that make it illegal for telemarketers to communication a phone number on the list.

Communications service providers also offer services that reduce telemarketing communications. BellSouth Corporation, for example, offers PRIVACY DIRECTOR® service (PRIVACY DIRECTOR® is a registered trademark of BellSouth Intellectual Property Corporation). This service tries to prevent unwanted calls, such as telemarketing calls, from ringing a subscriber's phone. This PRIVACY DIRECTOR® service does not connect a communication when the ICLID information is private. That is, the telecommunications switch recognizes when the ICLID information is marked private, so Caller ID cannot recognize the ICLID information. The PRIVACY DIRECTOR® service requires the calling party to i) unblock their telephone number or ii) announce their name. If the calling party unblocks their telephone number, then the ICLID information is delivered with the communication and the subscriber's Caller ID displays the number. If the calling party decides to announce their name, the telephone communication is routed to a media server. The media server plays an announcement that asks the calling party to record their name. The recorded name is delivered to the called party. The called party, prior to acceptance of the call, hears the recorded name of the calling party. The called party then has the option to accept the call. This PRIVACY DIRECTOR® service puts the called party in control as the recipient of the calls.

Now, however, telemarketers have learned to bypass the PRIVACY DIRECTOR® service. For example, telemarketers have begun to use public communications addresses to get around the PRIVACY DIRECTOR® service by unblocking their caller ID. The telemarketer's telephone number, then, is public as opposed to private. Because the telemarketer's telephone number is public, the PRIVACY DIRECTOR® service does not prevent a connection to the called party. The Caller ID service displays the ICLID information, the subscriber answers the incoming communication, and the subscriber is then subjected to the telemarketer's unwanted proposal.

There is, accordingly, a need in the art for identifying and processing undesirable incoming communications. For example, consumers want a quick and convenient way of disposing of incoming telemarketing and/or unsolicited communications.

SUMMARY

The exemplary embodiments include methods, systems, computer programs, and/or computer program products for screening unsolicited communications, such as incoming calls from telemarketers, surveys, and/or other communications. According to some of the embodiments, a communications service provider (e.g., a telecommunications provider, a data communications provider such as America Online, a cable communications provider, and other communications providers) provides this privacy screening service. According to some of the exemplary embodiments, a programmable caller identification service (also referred to herein as "Programmable Caller ID Screening," "Programmable Calling Party Screening," or "Privacy Screening") automatically identifies if an incoming communication is from a desirable caller, if the incoming communication is from an undesirable caller, or if service is unable to determine the communication is from a desirable caller.

According to some of the exemplary embodiments, if the communication is from a desirable caller, then the communication may be selectively processed. For example, if the communication is from a desirable caller, then the communications device may produce a distinct notification (e.g., selected ring tone, audible alert, or other alert). If the communication is from an undesirable caller, then terminate the communication to the subscriber's communications device and route the undesirable communication to a voice messaging and/or do not call service. Or, if the desirability of the caller is unknown, then provide an alternate distinctive alert to the subscriber.

And, according to further exemplary embodiments, the Programmable Caller ID Screening service may prompt the subscriber (or alternatively receive a communication screening request) to enter or otherwise identify ICLID information associated with a desirable incoming communication or associated with an undesirable incoming communication. For example, the communications screening request may comprise a Dual-Tone Multi-Frequency key (e.g., "Touch Tones") on a telephone keypad, a softkey entry on a communications device, and/or a data message from an Internet Protocol phone or client application. The communication screening request is accepted and sent to the intelligence controlling a communications switch coupled with the communications device. The intelligence controlling the communications switch interprets the communication screening request and determines what action is required. As an example, heretofore when a party depressed a touch-tone key during a communication, a tone was generated, yet the communications network may not have recognized that tone as requiring an action. This invention, however, implements an action in response to the communication screening request. For example, the action may include playing an announcement, terminating the connection, forwarding the incoming communication to voice mail, forwarding a party of an ongoing communication to a voice messaging system to interrupt and terminate the communication, storing a desirable ICLID signal to the Programmable Caller ID Screening profile of the subscriber, storing an undesirable ICLID signal to the Programmable Caller ID Screening profile of the subscriber, adding undesirable ICLID information to a Do Not Call list associated with the subscriber, and/or storing an undesirable ICLID signal in a subscriber's blocked communications list. The Do Not Call list, the subscriber's Programmable Caller ID Screening profile, and/or the subscriber's blocked communications list may include communications instructions for a called number (e.g., a communications address input by the subscriber or user) as well as include communications instructions for other registered communications addresses (e.g., other telephone numbers associated with the subscriber, an email address of the subscriber, and other communications addresses of the subscriber).

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

DESCRIPTION OF THE DRAWINGS

These and other features, aspects, and advantages of the exemplary embodiments are better understood when the following Description is read with reference to the accompanying drawings, wherein.

DESCRIPTION

Figure 1:
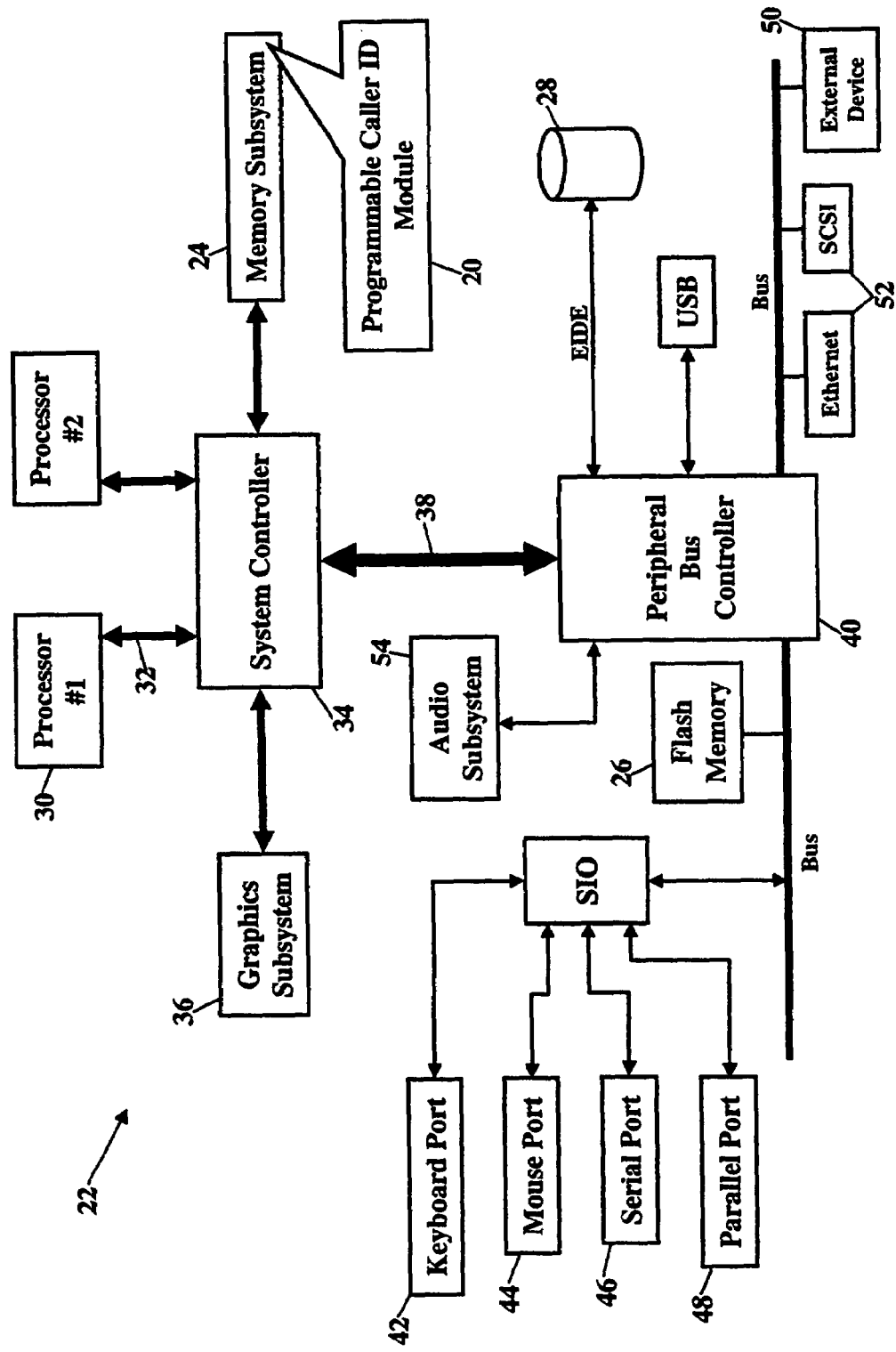
FIG. 1 is a block diagram showing a Programmable Caller ID Screening Module residing in a computer system according to some of the exemplary embodiments.

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

The exemplary embodiments include methods, systems, computer programs, and/or computer program products for providing programmable caller identification screening services. According to some of the exemplary embodiments, a Programmable Caller ID Screening service allows a subscriber to selectively receive screened incoming communications or to send a Programmable Caller ID Screening query for ICLID information during an interactive communication (e.g., telephone conversation). The Programmable Caller ID Screening query may comprise a Dual-Tone Multi-Frequency key (e.g., "Touch Tones") on a telephone keypad, a softkey entry on a communications device, and/or a data message from an Internet Protocol phone or client application. The Programmable Caller ID Screening query is accepted and sent to the intelligence controlling the communications switch (and/or communications network). The intelligence controlling the communications switch interprets the Programmable Caller ID Screening query and determines what action is required. As an example, heretofore when a party depressed a touch-tone key during a live telephone call, a tone was generated, yet the telecommunications network did not recognize that tone as requiring an action. This invention, however, implements an action in response to the Programmable Caller ID Screening query. The action could include interrupting the conversation, playing an announcement, terminating the connection, forwarding to voice mail, storing incoming line identification (ICLID) information of the communications signal in a Programmable Caller ID Screening database, adding the ICLID information to a Do Not Call list, updating a subscriber's profile with the ICLID information, and/or storing the ICLID information in a subscriber's blocked communications list. The Do Not Call list, the subscriber's profile, and/or the subscriber's blocked communications list may include communications instructions for the called number (i.e., the subscriber's communications address engaged in a conversation or receiving notification of an incoming communication) as well as include communications instructions for other registered communications addresses (e.g., other telephone numbers associated with the subscriber, an email address of the subscriber, and other communications addresses of the subscriber). According to some of the exemplary embodiments, the incoming communication may be initially filtered by examining whether the incoming communication is associated with a residential communications address (e.g., 1 FR line), with a business communications address (e.g., 1 FB), with a pay phone, with a cellular phone, with a prison, or otherwise categorized with dialing feature information (e.g., Universal Service Order Codes (USOCs).

Figure 2:
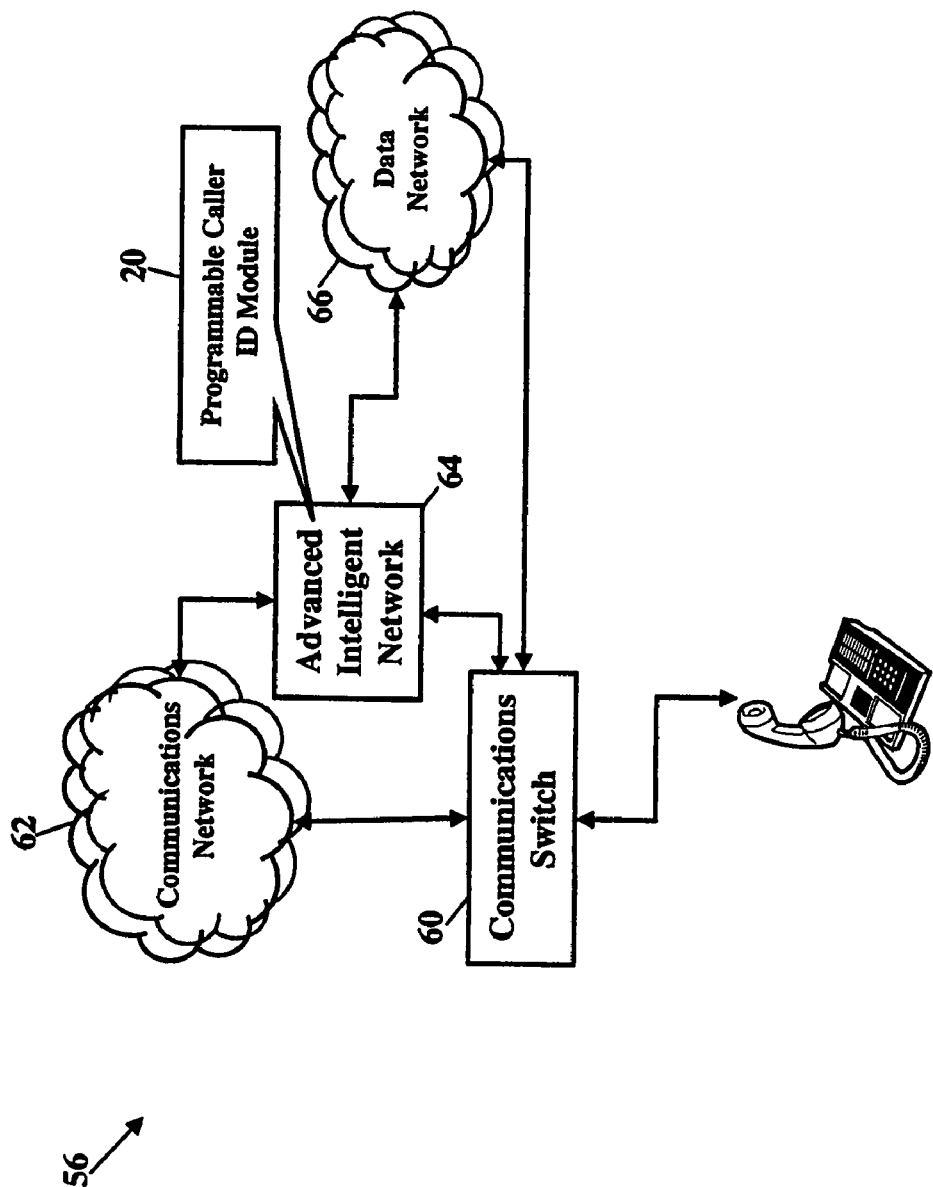
FIG. 2 is a schematic showing the Programmable Caller ID Screening Module operating within an intelligently-controlled telecommunications network according to some of the exemplary embodiments.
Figure 3:
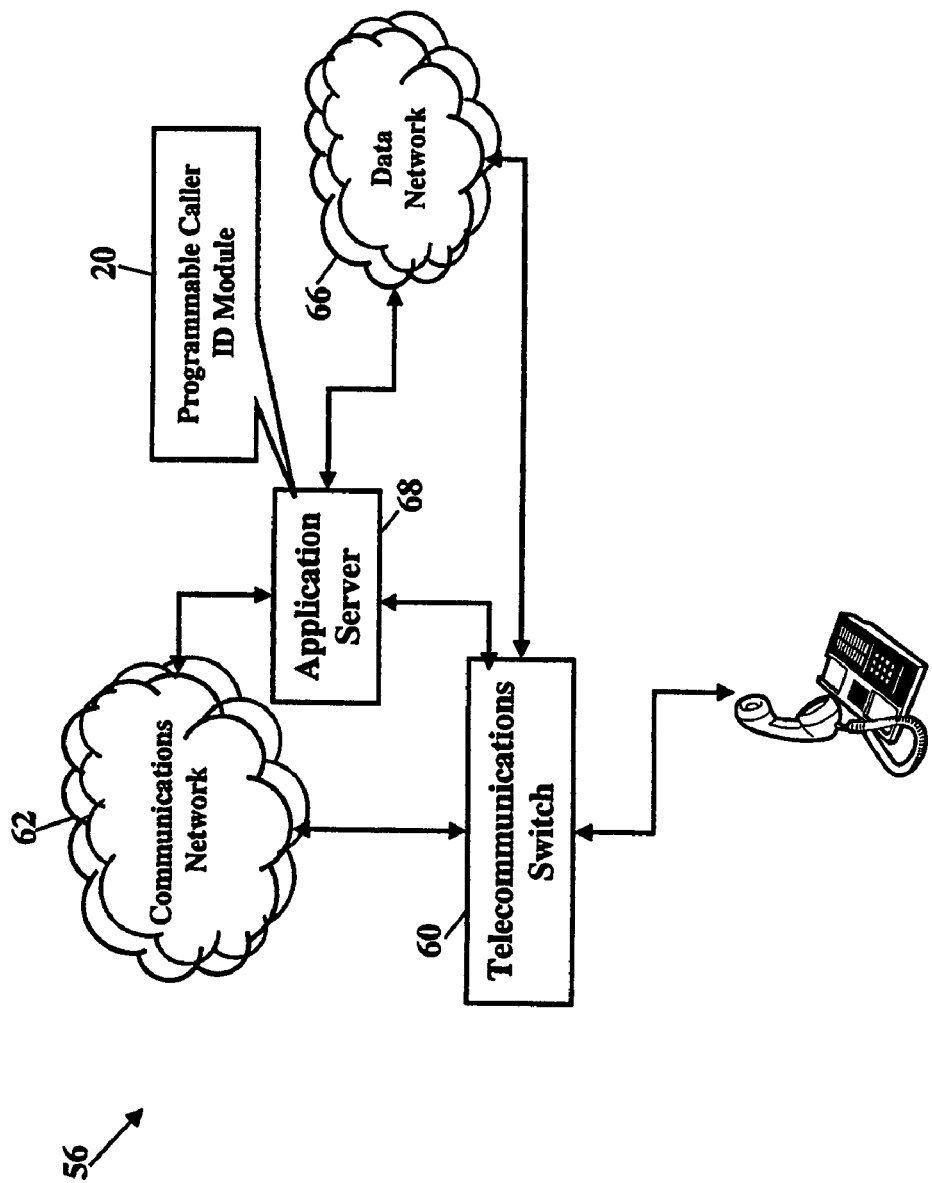
FIG. 3 is a schematic showing the Programmable Caller ID Screening Module operating within a packet network architecture according to some of the exemplary embodiments.

FIGS. 1-3 depict possible operating environments for exemplary embodiments of this invention. A Programmable Caller ID Screening Module 20 includes computer programs, computer systems, and communications systems that initially screen a call according to a subscriber's screening profile as well as allow a subscriber, in real time during a live telephone call, to take actions during the call. The Programmable Caller ID Screening Module 20, for example, allows the subscriber to hit a Dual-Tone Multi-Frequency key, a softkey, and/or a data message to play an announcement to the other party. This announcement may be a recording that rejects the caller, and the Programmable Caller ID Screening Module 20 could then automatically terminate the telephone call. Because the announcement may be personalized, the wording and tone of the announcement can be tailored to the subscriber's personality (e.g., a "soft" rejection or a "hard" rejection). The call screening request could alternatively forward the call to voice mail, thus still allowing the calling party to leave a message. The Programmable Caller ID Screening Module 20, however, also offers the subscriber the ability to add information associated with the ICLID (or other network associated communications address) signal of the incoming communication (e.g., name of calling party, communications address such as a telephone number of the calling party, a geographic location of the calling party, an identifier that the incoming communication is from a cellular phone, an identifier that the incoming communication is from a residential communications address, an identifier that the incoming communication is from a business communications address, and other information transmitted with the ICLID signal) to a Do Not Call list and add the ICLID information to the subscriber's blocked communications list.

FIG. 1 is a block diagram showing the Programmable Caller ID Screening Module 20 residing in a computer system 22. The Programmable Caller ID Screening Module 20 operates within a system memory device. The Programmable Caller ID Screening Module 20, for example, is shown residing in a memory subsystem 24. The Programmable Caller ID Screening Module 20, however, could also reside in flash memory 26 or peripheral storage device 28. The computer system 22 also has one or more central processors 30 executing an operating system. The operating system, as is well known, has a set of instructions that control the internal functions of the computer system 22. A system bus 32 communicates signals, such as data signals, control signals, and address signals, between the central processor 30 and a system controller 34 (typically called a "Northbridge"). The system controller 34 provides a bridging function between the one or more central processors 30, a graphics subsystem 36, the memory subsystem 24, and a PCI (Peripheral Controller Interface) bus 38. The PCI bus 38 is controlled by a Peripheral Bus Controller 40. The Peripheral Bus Controller 40 (typically called a "Southbridge") is an integrated circuit that serves as an input/output hub for various peripheral ports. These peripheral ports could include, for example, a keyboard port 42, a mouse port 44, a serial port 46 and/or a parallel port 48 for a video display unit, one or more external device ports 50, and networking ports 52 (such as SCSI or Ethernet). The Peripheral Bus Controller 40 could also include an audio subsystem 54. Those of ordinary skill in the art understand that the program, processes, methods, and systems described in this patent are not limited to any particular computer system or computer hardware.

The central processor 30 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

An exemplary operating system is WINDOWS® (WINDOWS® is a registered trademark of Microsoft Corporation, One Microsoft Way, Redmond Wash. 98052-6399, 425.882.8080, www.Microsoft.com). Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 24, flash memory 26, or peripheral storage device 28) may also contain an application program. The application program cooperates with the operating system and with a video display unit (via the serial port 46 and/or the parallel port 48) to provide a Graphical User Interface (GUI). The Graphical User Interface typically includes a combination of signals communicated along the keyboard port 42 and the mouse port 44. The Graphical User Interface provides a convenient visual and/or audible interface with a user of the computer system 22.

FIG. 2 is a schematic showing the Programmable Caller ID Screening Module 20 operating within an intelligently-controlled communications network 56. This communications network 56 further represents an operating environment for the Programmable Caller ID Screening Module 20. The communications network 56 includes a communications switch 60 that may includes Advanced Intelligent Network (AIN) componentry 64 controlling many features of the communications switch 60. The Advanced Intelligent Network (AIN) componentry 64 would include the Programmable Caller ID Screening Module 20 operating within the computer system (shown as reference numeral 22 in FIG. 1). The communications switch 60 and the Advanced Intelligent Network (AIN) componentry 64 may also interface with a data network 66.

The signaling between the communications switch 60, the communications network 62 (e.g., Public Switched Telecommunications Network), the Advanced Intelligent Network 64, and the data network 66, however, is well understood in the art and will not be further described. If a reader desires a more detailed explanation, the reader is directed to U.S. Pat. No. 5,430,719 issued to Weisser (Jul. 4, 1995), with the "Summary of the Invention" and the "Detailed Description of the Preferred Embodiment" sections incorporated herein by reference. The reader is also directed to U.S. Pat. No. 5,917,817 issued to Dunn et al. (Jun. 29, 1999), with the "Summary of the Invention" and the "Detailed Description" sections incorporated herein by reference.

FIG. 3 is similar to FIG. 2, yet FIG. 3 illustrates an exemplary packet network architecture. This exemplary packet network represents an alternative operating environment for the Programmable Caller ID Screening Module 20. Here the communications switch 60 includes a packet-based "softswitch." This softswitch uses software control to provide voice, data, and video services by dynamically changing its connection data rates and protocols types. An application server 68 interfaces with the softswitch via a packet protocol, such as Session Initiation Protocol (SIP). This application server 68 includes voice service protocols, triggers, and operations that allow the communications network 62 and the data network 66 to interoperate.

Figure 4:
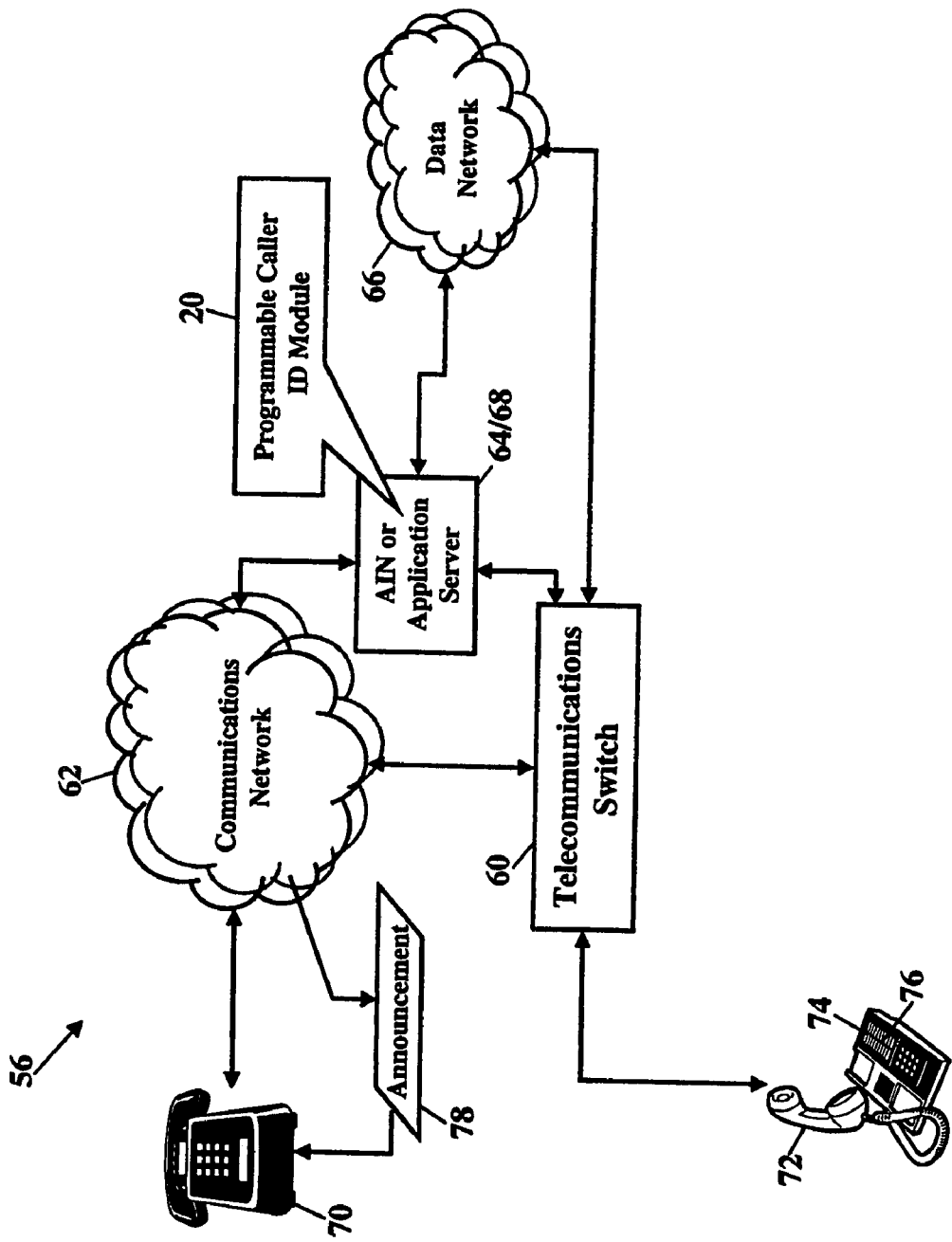
FIG. 4 is a schematic illustrating an exemplary embodiment of providing Programmable Caller ID Screening services.

FIG. 4 is a schematic illustrating an exemplary embodiment of providing Programmable Caller ID Screening services upon receiving an incoming call or during telephone calls. Here the Programmable Caller ID Screening Module 20 may initially screen a call using information in the Programmable Caller ID Screening Module 20, such as, an identifier that the incoming call is from a residential address, an identifier that the incoming call is from a business address, an identifier the incoming call is from a communications address in a prison, an identifier that the incoming call is from a pay phone or from a party wishing to charge the subscriber for the call, an identifier that the call is from a cellular phone, an identifier that the incoming call is associated with a private branch exchange (PBX) (e.g., hotel, hospital, governmental entity, etc.), and a geographic identifier associated with a calling party's communications address. For example, the subscriber may want to answer calls from residential communications addresses, cellular phones, and from a selected PBX. However, the subscriber may not want to answer calls from a commercial class of service, such as, calls from a hotel, hospital, governmental entity, or a business, and these commercial classes of service may identify calling telephone number as an undesirable calling party in the Programmable Caller ID Screening Module 20. In addition, the Programmable Caller ID Screening Module 20 allows a subscriber, in real time during a live telephone call, to take actions during the call. If either party to the telephone call is a subscriber to this Programmable Caller ID Screening service, then the Programmable Caller ID Screening Module 20 allows the subscriber to utilize a call screening request during the actual telephone call. The call screening request may comprise a Dual-Tone Multi-Frequency tone on a telephone keypad, a softkey on a similar keypad, and/or a data message (e.g., an SIP message). As FIG. 4 shows, a telephone call is placed from a calling telephone number 70 (hence the calling party) to a called telephone number 72 (the called party). The telephone call is processed from the calling party (the incoming communications signal along with the incoming line identification information 70), into the communications network 62, and to the destination communications switch 60 serving the called party (the called telephone number 72). The intelligence controlling the destination communications switch 60 detects a trigger that identifies either party as a subscriber to this Programmable Caller ID Screening service. The destination communications switch 60 is then instructed to establish a connection between the ICLID information and the called telephone number, thus allowing the parties to converse.

Once the connection is established, the live telephone call is monitored for the call screening request. The live telephone call is monitored for the next event, and that event is entry of the call screening request. The terms "monitor," "monitoring," and "monitored" mean the communications network 56 listens for, and/or is able to detect, a Dual-Tone Multi-Frequency tone signal, entry of a softkey, or receipt of a data message. The communications switch 60, for example, may listen for the Dual-Tone Multi-Frequency tone, or the communications switch 60 may be instructed to listen for the Dual-Tone Multi-Frequency tone. The terms "monitor," "monitoring," and "monitored" may also mean the Advanced Intelligent Network componentry 64, or the application server 68, listens for the Dual-Tone Multi-Frequency tone. The Advanced Intelligent Network componentry 64, or the application server 68, could instruct or command some portion of the communications network 56 to listen for the Dual-Tone Multi-Frequency tone. As those of ordinary skill in the art understand, Dual-Tone Multi-Frequency signaling is a means of transferring information from a party to the communications network 56 through the use of in-band audio tones. Each digit of information is assigned a simultaneous combination of one of a lower group of frequencies and one of a higher group of frequencies to represent each digit or character. The communications network 56 monitors the telephone call for the next event to happen—in this case, the next event is entry of a Dual-Tone Multi-Frequency tone. That Dual-Tone Multi-Frequency tone is accepted and sent to the intelligence controlling the communications switch 60 (such as the Advanced Intelligent Network componentry 64 or the application server 68) for interpretation and for an action.

Upon entry of a Dual-Tone Multi-Frequency tone, the communications network 56 takes an action. This invention allows the subscriber to utilize the touch-tone keys 74 on the telephone keypad 76 during the telephone call. Heretofore when a party depressed a touch-tone key 74 during a live telephone call, a tone was generated, yet the communications network 56 did not recognize that tone as requiring a call screening action. This invention, however, implements an action in response to the Dual-Tone Multi-Frequency tone. This invention, for example, launches a next event list and arms the T_DTMF_ENTERED event in the authorize termination message. This event could make the communications switch 60 listen in on the telephone call and wait for a DTMF event. When the subscriber presses any key 74 on the keypad 76, and hangs up, the Programmable Caller ID Screening Module 20 launches an event back to the Advanced Intelligent Network 64 (e.g., a Service Control Point). The Advanced Intelligent Network 64 checks the digit that was entered by the subscriber and takes the appropriate action. The action could include playing an announcement, terminating the connection, forwarding to voice mail, storing the ICLID information in a database, adding the ICLID information (or other line identification information) to a Do Not Call list, updating a subscriber's profile with the ICLID information, and/or storing the ICLID information in a subscriber's blocked communications list.

A call screening request, for example, could be used to reject incoming marketing communications such as solicitations. For example, when a subscriber receives a telemarketing call, the subscriber may, in real time during the live telephone call, enter the call screening request. The subscriber, for example, could hit a Dual-Tone Multi-Frequency key 74 on the keypad 76, hit a softkey on the keypad, or send a data message from a computer device. The communications network 56 recognizes that call screening request tone as requiring an action. Here, for example, that action might be playing an announcement 78 to the calling party. This announcement might be a network-based "telemarketing slam" that rejects the telemarketer. Once the announcement is played, the communications network 56 could also be instructed to terminate the connection between the calling party and the called telephone number. This method of rejecting telemarketing calls (i.e., playing the announcement and then terminating the call) would appeal to those subscribers who desire a quick, convenient and, yet, polite method of disposing of telemarketers.

Another action might be voicemail. When a subscriber receives a telephone call, the subscriber may, in real time during the live telephone call, enter the call screening request. The subscriber, for example, could hit the Dual-Tone Multi-Frequency key 74 on the keypad 76, hit a softkey on the keypad, or send a data message from a computer device. The communications network 56 recognizes that call screening request as requiring an action. Here the action is forwarding the telephone call to voicemail. At any time during the telephone call the subscriber could forward the other party to voicemail. The other party would hear the subscriber's voicemail announcement. The other party to the telephone call could then record a voicemail message to a voicemail database (shown as reference numerals 78, 84 in FIG. 5), and the subscriber could retrieve this voicemail message at a later time. If, for example, a subscriber is intrigued by a telemarketing proposal, yet does not want to talk with the telemarketer, the subscriber could enter a Dual-Tone Multi-Frequency tone and forward the telemarketer to voicemail. The subscriber could then retrieve the voicemail message at a more convenient time.

This voicemail feature, however, is not only for telemarketing. This voicemail feature would also appeal to anyone requiring voicemail during a live telephone call. When, for example, a more important situation arises during the telephone call, the subscriber may forward the other party to voicemail, tend to the important situation, and later retrieve the voicemail message.

The announcement could be personalized. The subscriber could access the intelligence controlling the communications switch 60 and record a personalized announcement. The subscriber, for example, could access a media server using a toll-free administrative telephone number. The media server could utilize Caller ID to recognize the subscriber's home telephone number, or the media server could prompt for a subscribing telephone number. The media server steps the subscriber through a series of prompts and allows the subscriber to record the personalized announcement. The personalized announcement could be any greeting, message, or telemarketing rejection. The personalized announcement could be stored as a specific file in the media server. When the subscriber then enters a DTMF during a live telephone call, the communications switch 60 could then play the personalized announcement. The communications switch 60, instead, could be instructed to forward the telephone call to the media server for the personalized announcement The subscriber might have a number of different personalized announcements, and the particular announcement depends upon which DTMF is entered. If the subscriber, for example, enters a "4" on the keypad 76, the communications switch 60 sends the telephone call to the intelligence (e.g., the AIN 64 or the application server 68). The intelligence recognizes that Dual-Tone Multi-Frequency tone as requiring an action, and this action is playing the particular personalized announcement corresponding to the DTMF. The intelligence returns instructions to the communications switch 60 to forward that telephone call to the media server. The media server accesses the particular personalized announcement corresponding to the called telephone number and the DTMF. The media server then plays the particular personalized announcement.

Figure 5:
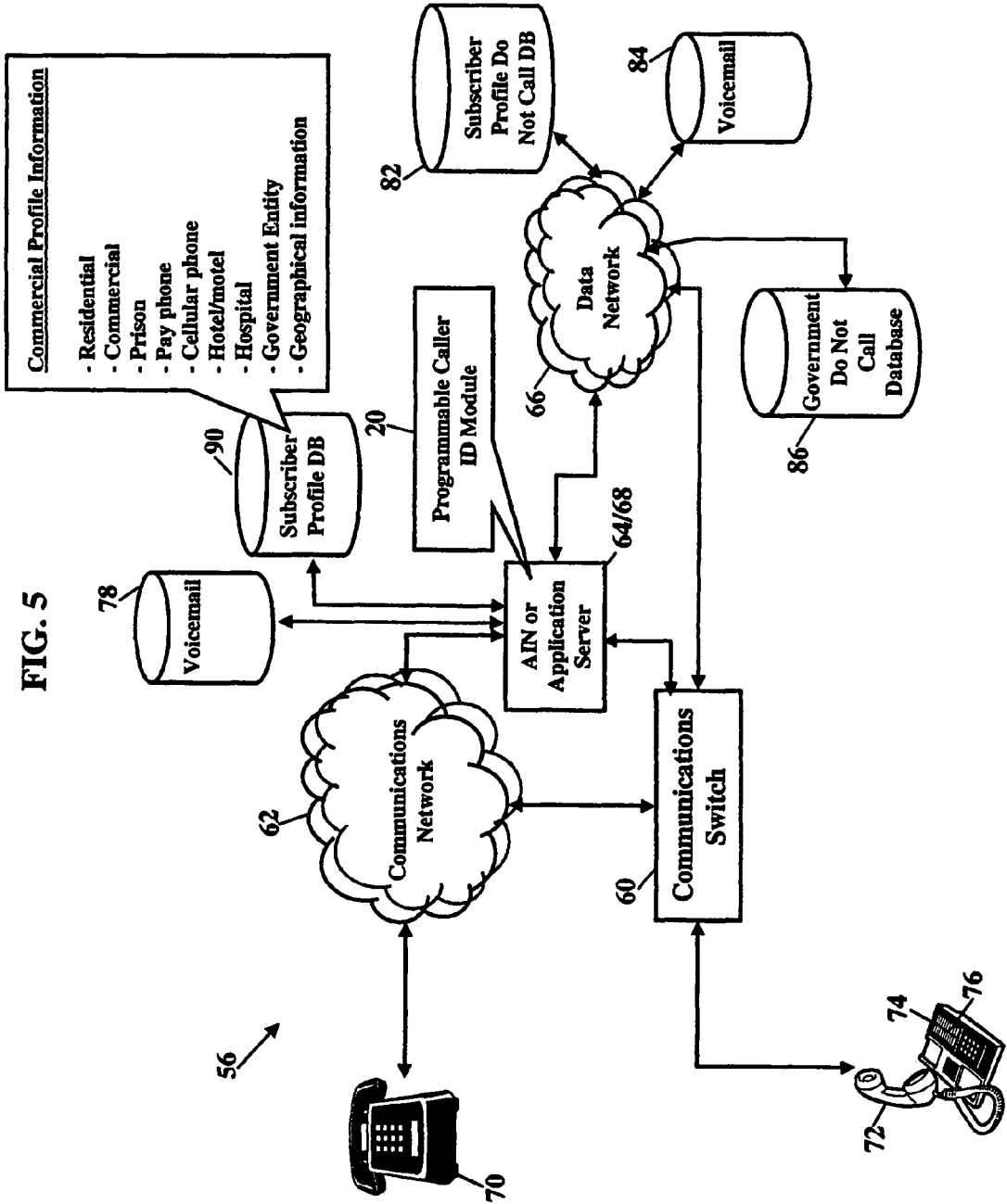
FIG. 5 is a schematic illustrating an exemplary embodiment of storing ICLID information of the incoming communication in a database.

FIG. 5 is a schematic illustrating another exemplary embodiment for providing Programmable Caller ID Screening service during telephone calls. Here the action taken is storing the ICLID information associated with the incoming marketing communication in a database. When the subscriber enters the call screening request, for example, the communications network 56 could add the ICLID information to a Subscriber Profile database 90 that maintains data regarding the commercial, residential, and or other feature information about the incoming call. This Subscriber Profile database 90 could contain one or more telephone numbers and/or other communications addresses (e.g., email address, IP address, and other communications addresses) of a subscriber that do not wish to receive undesired calls. As used herein, the term "subscriber" includes customers, consumers, and users of a communications device at a communications address (e.g., the called number, an email address, a cell phone number, etc.). Because the subscriber need only enter the call screening request to add/register a communications address (e.g., telephone number) to the Subscriber Profile database 90, the Programmable Caller ID Screening service provides a very quick and convenient method of preventing subsequent marketing communications. Further, the call screening request could also update other Do Not Call lists, such as wireless versions, wireline versions, electronic communications addresses, a spouse's version, a kid's version, and/or combined versions. When the call screening request is entered, the ICLID information of the incoming undesired communication could be forwarded to a remote database 82 via the data network 66. The remote database 82, for example, could be a government Do Not Call list. The ICLID information, for example, could be communicated to a subscriber's Do Not Call database 82, voicemail 84, or a Government Do Not Call database 86 via the data network 66. The Government Do Not Call database 86 could be provided by a state governmental agency (e.g., the state attorney general), a federal government agency (e.g., Federal Trade Commission). When the subscriber enters the call screening request, the communications network 56 could automatically add the ICLID information to various databases, thus further reducing unwanted telemarketing calls.

This Programmable Caller ID Screening service also helps the subscriber prove violations of Do Not Call lists and/or monitoring services. Some state and federal laws prohibit telemarketing calls to telephone numbers on these Do Not Call lists. Because the communications network 56 maintains a date and a time of any telephone call, the communications network 56 could "tag" each telemarketing call. When the subscriber enters the call screening request, and the communications network 56 adds/communicates the ICLID information to a Do Not Call list/database 82, the communication could also include the date and time of the undesired telephone call as well as other line identification information. When future telephone calls are received, the communications network 56 could query the Do Not Call list/database for the line identification information, ICLID information, similar line identification information (e.g., incoming calls censored from a geographic area). If a match is found, the Programmable Caller ID Screening service could alert the subscriber and provide dates and times of the matching telephone numbers. The subscriber would then have evidence to pursue legal action against the telemarketer.

Figure 6:
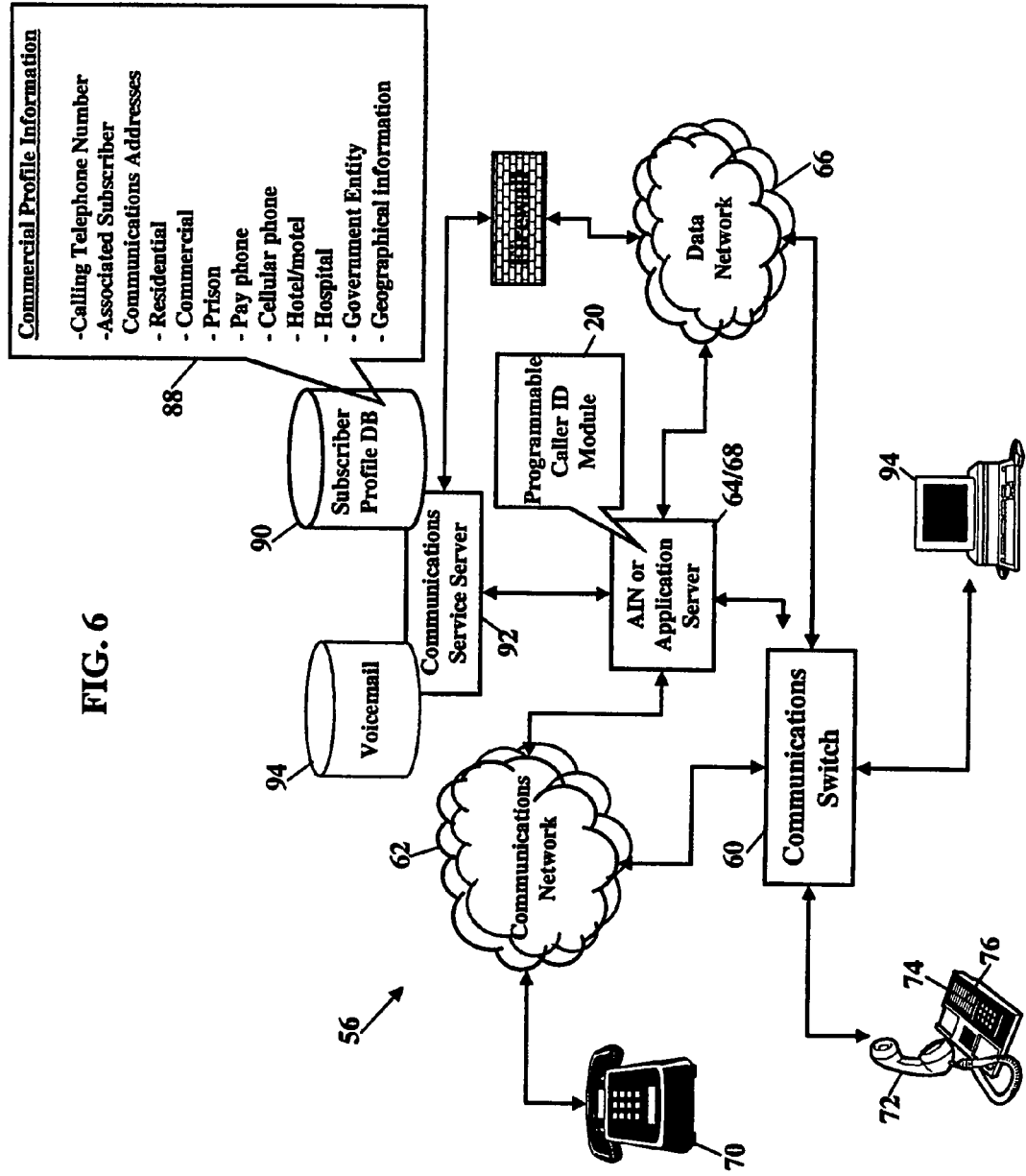
FIG. 6 is a schematic illustrating another exemplary embodiment for updating a subscriber's profile information with the ICLID information.

FIG. 6 is a schematic illustrating still another exemplary embodiment for providing Programmable Caller ID Screening service during telephone calls. When the subscriber sends the call screening request during a live telephone call, the communications network 56 recognizes that call screening request (such as a Dual-Tone Multi-Frequency tone) as requiring an action. Here the action comprises updating a subscriber's profile information 88 with the ICLID information of the incoming marketing communication. The subscriber's profile information 88 is stored in a database 90 of customer profiles. The database 90 of customer profiles is maintained on the Advanced Intelligent Network 64 or the application server 68 or, as FIG. 6 shows, a communications service server 92 communicates with the Advanced Intelligent Network 64 or the application server 68. The database 90 of customer profiles could also be maintained on a computer/server operating on the data network 66.

The profile information 88 is updated with the ICLID information. That is, when the subscriber enters the call screening request during a live telephone call, the action taken comprises storing the ICLID information in a subscriber's blocked communications list. The subscriber's blocked communications list contains calling telephone numbers (and other potential marketing communications addresses, such as an identifier of that the incoming call is from a cell phone in Florida) that the subscriber wishes to block or otherwise route to voice mail 94. When the communications switch 60 receives a subsequent telephone call, the intelligence controlling the switch 60 (the Advanced Intelligent Network 64 or the application server 68) suspends processing of the telephone call. A query is sent to determine if the ICLID information is found in the customer's profile information 88 and, hence, blocked from receipt. If the ICLID information is blocked, the caller is offered no additional opportunity to bypass the block. The ICLID information could also be added to related profiles, such as a spouse's profile, a child's profile, a wireless profile, and a wireline profile. Further, the profile information 88 may also include other associated subscriber communications addresses (e.g., a cell phone number, an identifier that the call is from a residential communications address, an identifier that the call is from a business address, an email address, and other communications addresses) that the subscriber wants to prevent subsequent communications from the calling party. That is, the telemarketer would be blocked from calling multiple communications addresses of the subscriber.

Figure 7:
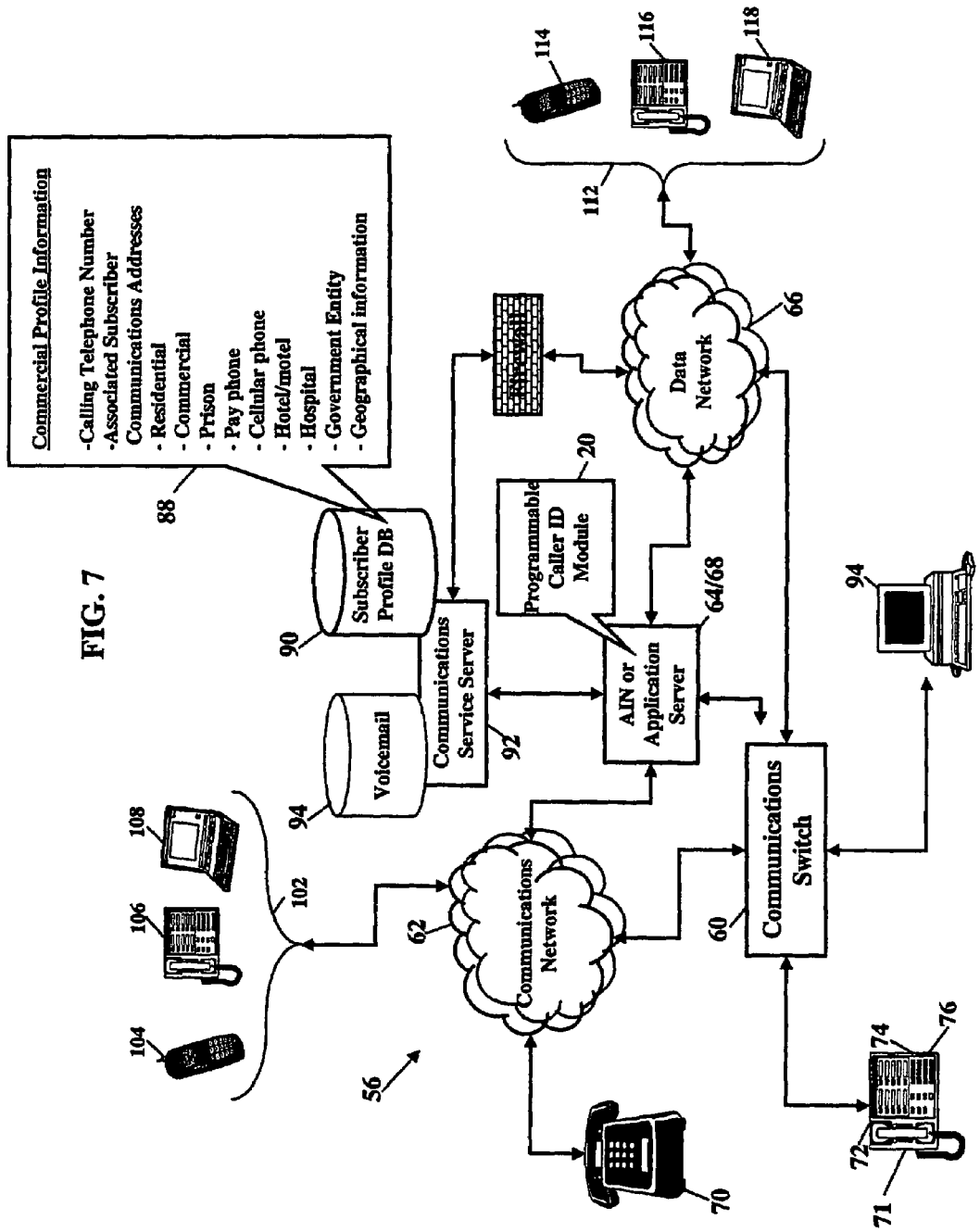
FIG. 7 is a schematic illustrating still another exemplary embodiment for updating the subscriber's profile information with the ICLID information.

FIG. 7 is a schematic illustrating an exemplary embodiment for providing Programmable Caller ID Screening services to one or more other registered subscriber telecommunications addresses 102 and/or one or more other registered subscriber data communications addresses 112. These other registered communications addresses 102, 112 are stored with the profile information 88 in the database of customer profiles 90. When a subsequent incoming communication is placed from the calling party to one of the registered subscriber communications addresses 102, 112, the subsequent incoming communication to the registered subscriber communications address 102, 112 is also blocked from receipt (or alternatively, the incoming communication is processed according to the profile information, such as routing to voice mail 94, updating a state or federal database, etc.). The registered telecommunications addresses 102 may include communications addresses for a cellular phone 104, another telephone 106, and another personal computer 108. Similarly, the registered data communications addresses 112 may include another cellular phone 114, another telephone 116, and another personal computer 118. Still further, these associated communications devices may also include a Voice over Internet Protocol (VoIP) phone and other communications devices.

As those of ordinary skill understand, the subscriber's profile information 88 relates to the subscriber's Programmable Caller ID Screening services. The specific information related to the provision, presence, and/or availability of these communication services is termed the "profile information" 88. This profile information 88 may include information related to the subscriber's calendar (e.g., appointments and activities), travel itinerary information, presence and availability information, other associated subscriber communications addresses, and the subscriber's patterns of behavior. If the reader wishes to learn more about the profile information 88, and how the subscriber may view, add, delete, and otherwise define the subscriber's communications services and the profile information 88, the reader is referred to the commonly-assigned U.S. application Ser. No. 10/012,746, filed Dec. 7, 2001, and which the "Summary" and "Detailed Description" sections are incorporated herein by reference. The reader is also directed to the commonly assigned U.S. application Ser. No. 10/107,616, filed Mar. 27, 2002, and which the "Brief Summary of the Invention" and "Detailed Description of the Invention" sections are incorporated herein by reference.

The profile information 88 may also be accessed by the subscriber. The subscriber may use a computer system 94 to access the communications service server 92 via a connection to the communications switch 60 and a connection to the data network 66. The computer system 94 allows the subscriber to access the subscriber's profile information 88 and view/edit/delete information. Although the call screening request causes an automatic update of the blocked communications list, the subscriber could also access the profile information 88 and add telephone numbers to the list of blocked telephone numbers.

Figure 8:
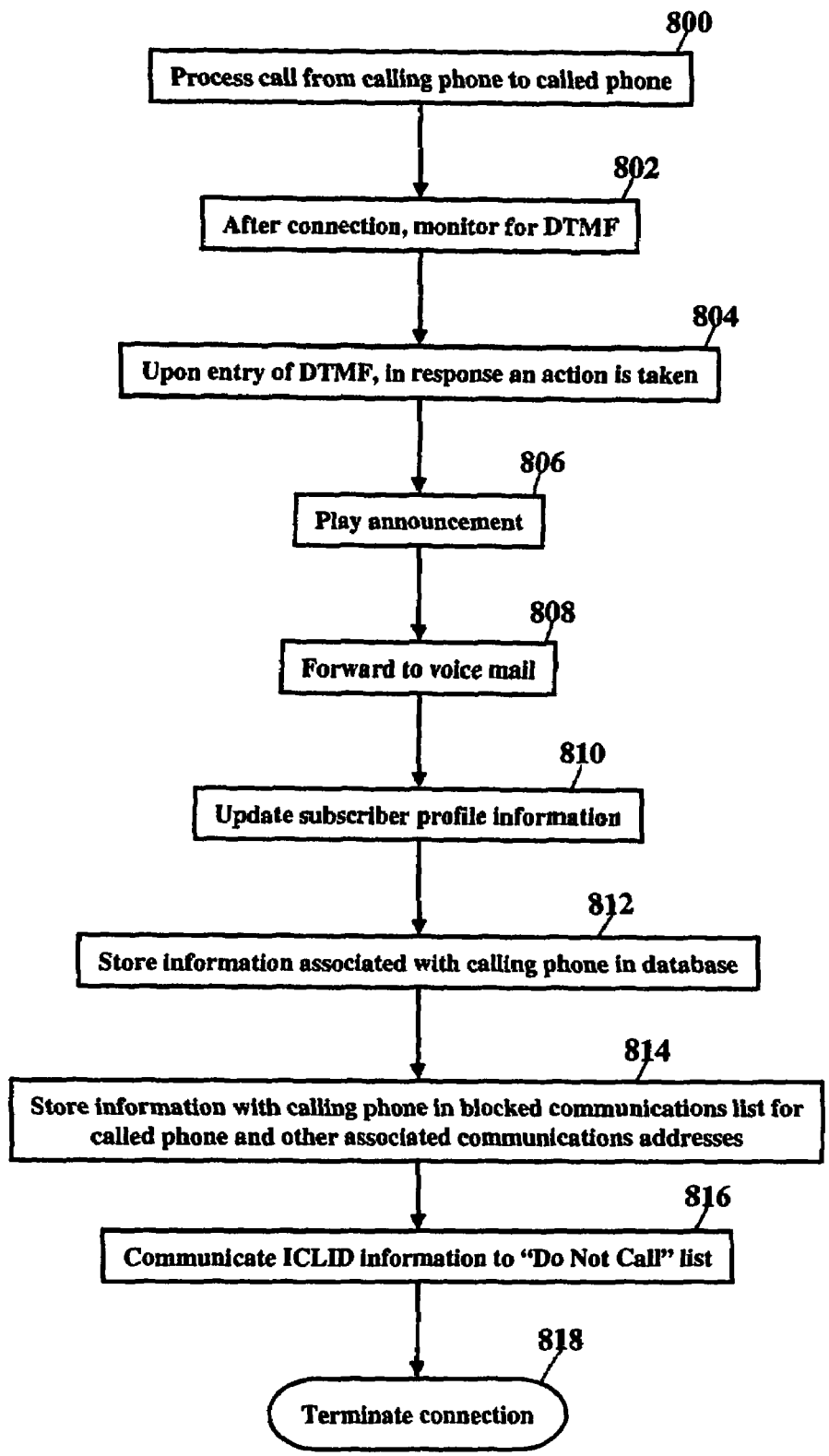
FIG. 8 is a flowchart showing an exemplary method of providing Programmable Caller ID Screening services.

FIG. 8 is a flowchart showing a method of providing Programmable Caller ID Screening service. A telephone call is processed from a calling telephone number to a called telephone number (Block 800). The term "processing," as used herein, encompasses every event from the time the ICLID information (shown as reference numeral 70 in FIGS. 4-7) goes off-hook to the termination of the telephone call. "Processing" of the telephone call includes routing a voice path and signaling setup and intelligence (e.g., Local Number Portability queries, queries to retrieve Calling Name/Number information, intelligence queries by the AIN 64 or the applications server 68, and standard signaling messages to determine call routing paths). The term "processing" also includes monitoring an established telephone call for possible Dual-Tone Multi-Frequency tone entry, switch hook flash, other events that indicate a party on the telephone call has requested an action, and delivery of call-waiting tones and data. "Processing," however, also encompasses billing activities and measurements at the communications switch 60 or other communications network 56 element.

After a connection between the ICLID information and the called telephone number, the telephone call is monitored for an event (Block 802). Here, that event is entry of a call screening request, such as a Dual-Tone Multi-Frequency tone. Upon entry of the Dual-Tone Multi-Frequency tone, an action is taken in response to the Dual-Tone Multi-Frequency tone (Block 804). The action might comprise playing an announcement (Block 806), forwarding the telephone call to voice mail (Block 808), and updating a subscriber's profile with the ICLID information (Block 810). The action might also comprise storing the ICLID information in a database (Block 812), storing the ICLID information in the subscriber's blocked communications list for the called phone and for other associated communications addresses (Block 814), and/or communicating the ICLID information to a Do Not Call list (Block 816). The Do Not Call list could be maintained by a telecommunications service provider, a third party, a state government entity, and/or a federal government entity. The action could also comprise terminating the connection (Block 818).

Figure 9:
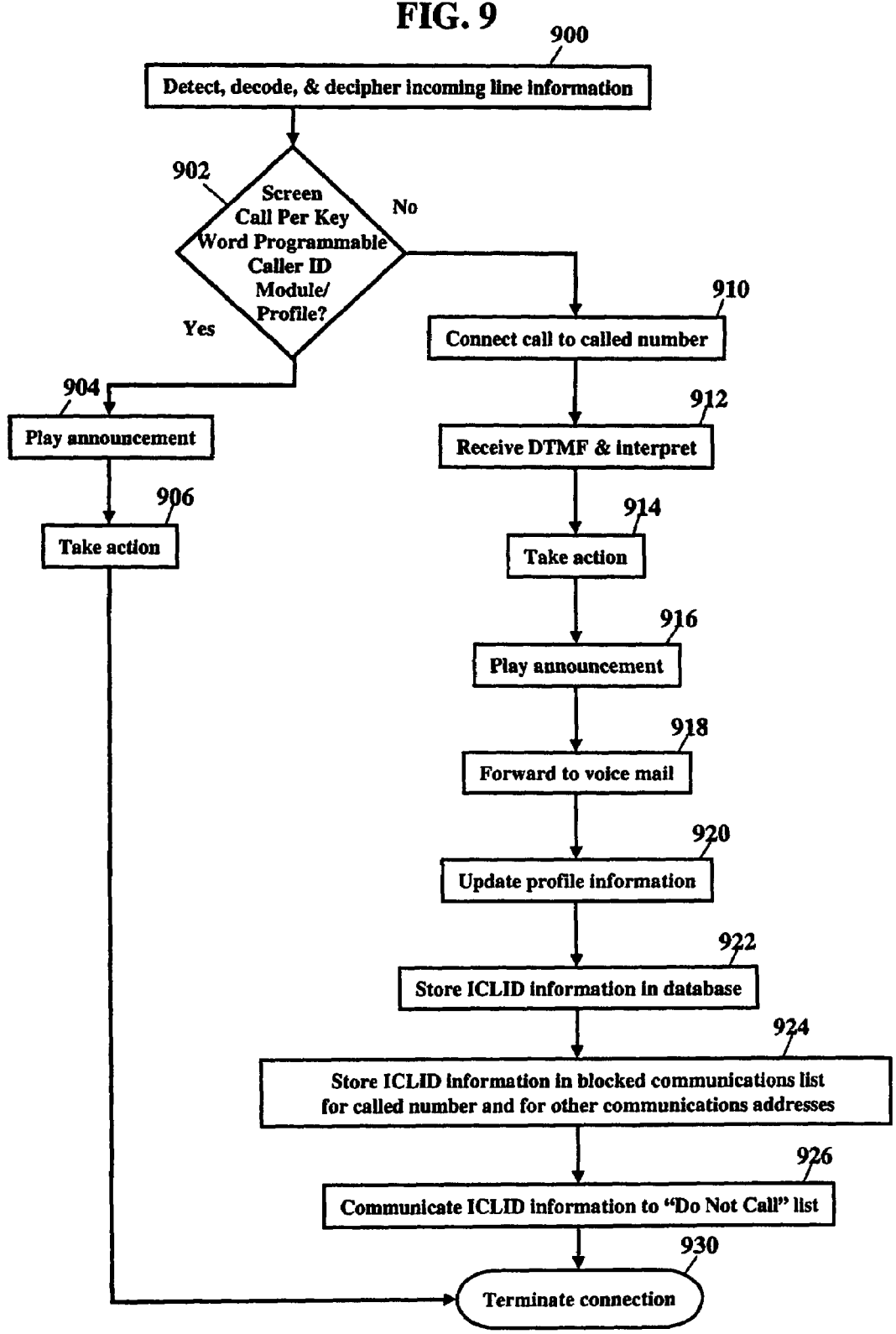
FIG. 9 is a flowchart showing another exemplary method of providing Programmable Caller ID Screening services.

FIG. 9 is a flowchart showing another method of providing Programmable Caller ID Screening service. A telephone call is detected, decoded, and deciphered in a communications network (Block 900). The telephone call is from a calling telephone number to a called telephone number. The ICLID or other incoming line identification information of the calling telephone number is compared with the subscriber profile to match screening fields. For example, if the incoming call is from a screened cellular phone in Canada matching the profile information, then the Programmable Caller ID Screening service may play an announcement (Block 904), take an action (Block 906), and terminate the connection (Block 930). If, however, the incoming call is not initially identified as an undesirable call, then the telephone call is connected to the called telephone number (Block 910). A call screening request, such as a Dual-Tone Multi-Frequency tone, is received from the called telephone number (Block 912), and an action is taken in response to the call screening request (Block 914). The action might comprise playing an announcement (Block 926), forwarding the telephone call to voice mail (Block 918), and updating a subscriber's profile with the ICLID information (Block 920). The action could also comprise storing the ICLID information in a database (Block 922), storing the ICLID information in a subscriber's blocked communications list for the called phone and for other associated communications addresses (Block 924), and communicating the ICLID information to a Do Not Call list (Block 926). Thereafter, the connection with the incoming call may be terminated (Block 930).

Figure 10:
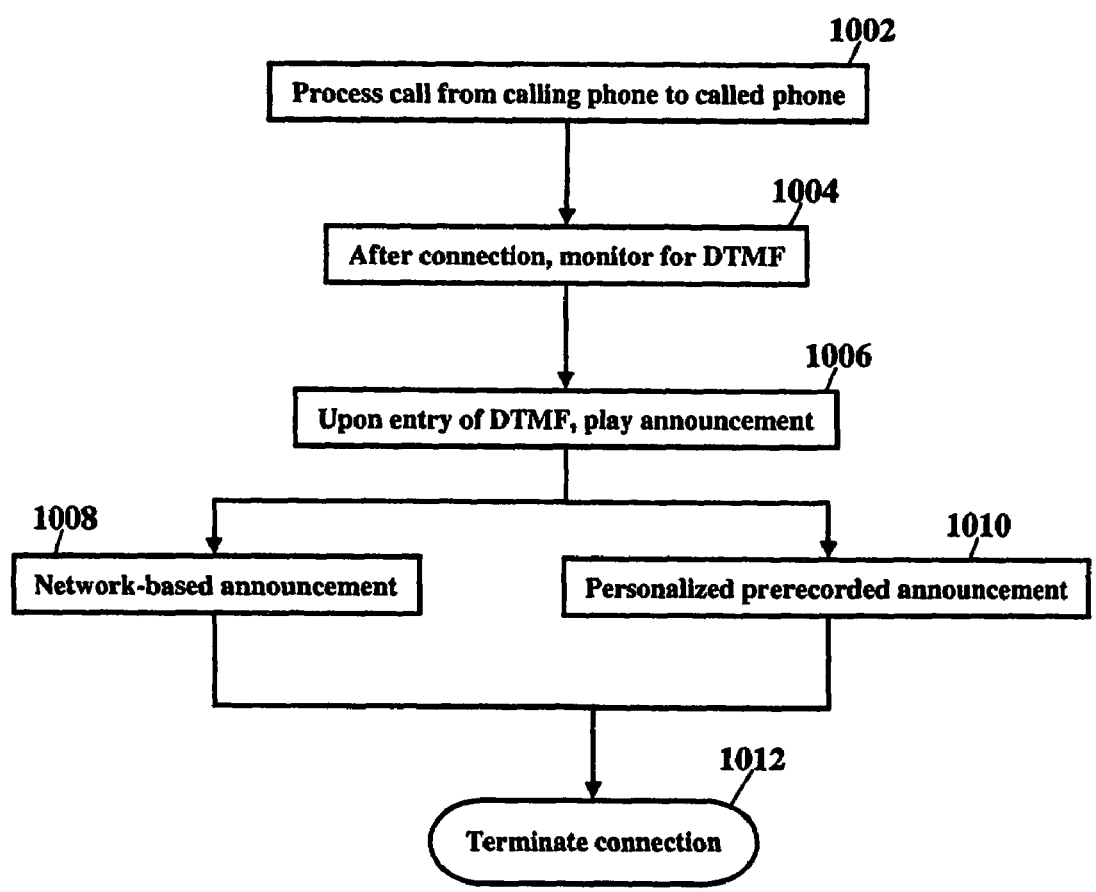
FIG. 10 is a flowchart showing still another exemplary method of providing Programmable Caller ID Screening services.
Figure 11:
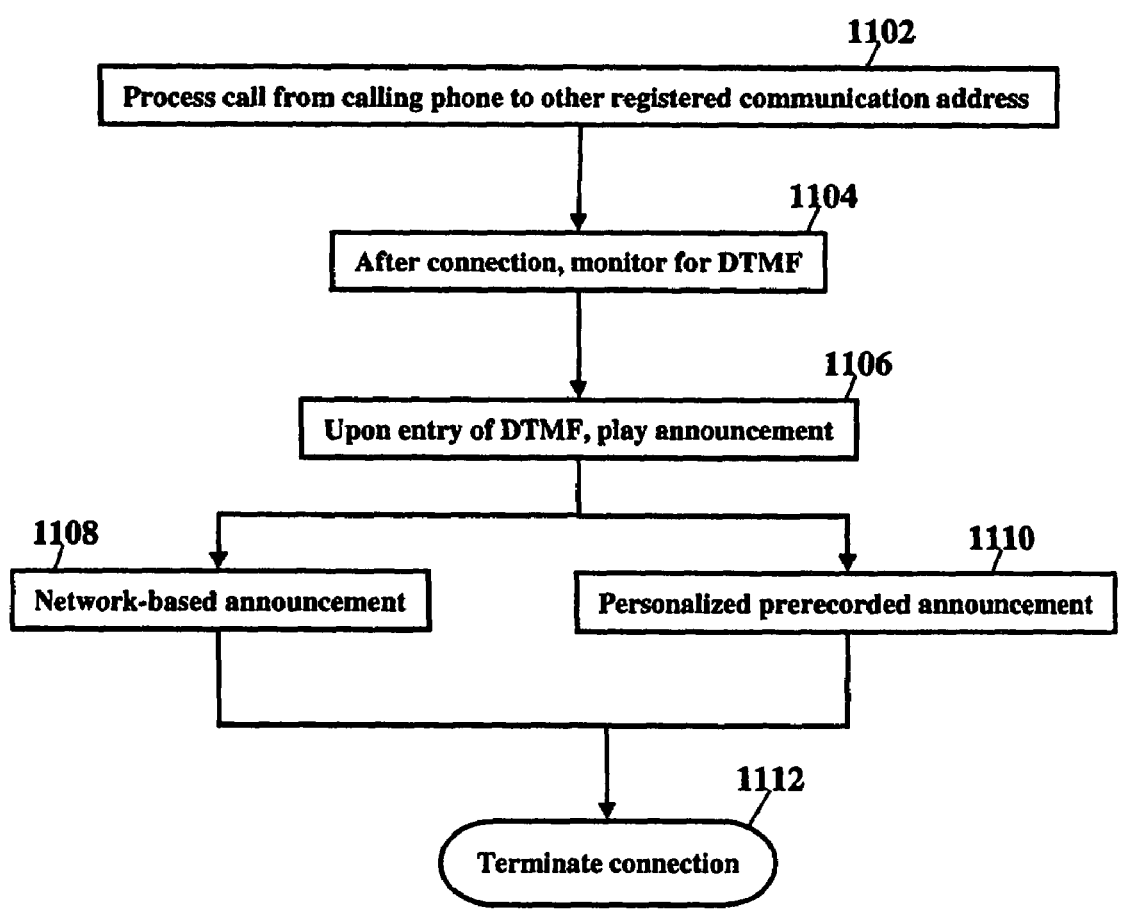
FIG. 11 is a flowchart showing yet another exemplary method of providing Programmable Caller ID Screening services.

FIGS. 10 and 11 are flowcharts showing other methods of providing Programmable Caller ID Screening service. A telephone call is processed from a calling telephone number to a called telephone number (Block 1002) or other associated, registered communications addresses (Block 1102). For example, the other associated, registered communications addresses may include other registered subscriber telecommunications addresses 102 (e.g., cellular phone, DSL, etc.) and/or one or more other registered subscriber data communications addresses 112 (e.g., email). After a connection between the ICLID information and the called telephone number, the telephone call is monitored for entry of a Dual-Tone Multi-Frequency (Blocks 1004, 1104). Upon entry of the Dual-Tone Multi-Frequency, an announcement is played (Block 1006, 1106). The announcement may be network-based (Block 1008, 1108) or a personalized prerecorded announcement of either party to the telephone call (Block 1010, 1110). The connection is then terminated (Block 1012, 1112).

According to some of the exemplary embodiments, the Programmable Caller ID Screening service may also be available after termination of the telephone call. After the subscriber hangs up the phone, the subscriber could still have an opportunity to screen the calling telephone. Assume the subscriber accepted the call and, after terminating the call, decides to block receipt of future calls from that same calling telephone number. The call screening request could also be recognized after termination of the call. The Programmable Caller ID Screening Module (shown as reference numeral 20 in FIGS. 1-7) could query the subscriber's profile information. The subscriber's profile information could contain a "last call received" data field. This "last call received" data field stores the ICLID information of the last received call. When the subscriber's telephone is offline, and the when the subscriber enters a predetermined call screening request, this call screening request instructs the Programmable Caller ID Screening Module (or some other application) to add the ICLID information of the last received call to the customer's profile. The "last call received" data field could even be temporary and change after each incoming call to avoid maintaining a long list of previously received calls. The subscriber could, for example, enter a Dual Tone Multi-Frequency tone to add the last received calling telephone number to the subscriber's profile. The subscriber could then, after termination of the call, add the ICLID information to the Do Not Call list or blocked communications list.

The Programmable Caller ID Screening Module (shown as reference numeral 20 in FIGS. 1-7) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Programmable Caller ID Screening Module to be easily disseminated. A computer program product for providing Programmable Caller ID Screening during a telephone call comprises the computer-readable medium and the Programmable Caller ID Screening Module. The Programmable Caller ID Screening Module is stored on the computer-readable medium.

The Programmable Caller ID Screening Module (shown as reference numeral 20 in FIGS. 1-7) may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While this invention has been described with respect to various features, aspects, and embodiments, those skilled and unskilled in the art will recognize this invention is not so limited. Other variations, modifications, and alternative embodiments may be made without departing from the spirit and scope of this invention.

What is claimed is:

1. A method, comprising:

detecting a telephone call at a telecommunications switch, the telephone call from a calling telephone number to a called telephone number;

decoding the calling telephone number for line identification information;

comparing the line identification information with a subscriber profile;

in response to the comparing, if the line identification information matches a commercial class of service, then identifying the calling telephone number as a business placing an undesired telephone call, then:
 automatically playing an announcement,
 storing a date and time of the undesired telephone call; and
 terminating the connection;

in response to the comparing, if the line identification information does not match the commercial class of service then:

establishing a connection between the calling telephone number and the called telephone number;

after the connection between the calling telephone number and the called telephone number, monitoring the telephone call for a call screening request associated with the commercial class of service, the commercial class of service identifying the calling telephone number as an undesirable calling party;

upon entry of the call screening request, taking an action in response to the call screening request;

wherein the taking an action comprises storing incoming line identification information of the calling telephone number in a database and updating the subscriber profile with the incoming line identification information, the subscriber profile associated with the called telephone number.

2. A method according to claim 1, wherein the taking an action comprises playing an announcement.

3. A method according to claim 1, wherein the taking an action comprises terminating the connection.

4. A method according to claim 1, wherein the taking an action comprises forwarding the telephone call to voice mail.

5. A method according to claim 1, wherein the taking an action comprises communicating the incoming line identification information to a Do Not Call list, the Do Not Call list associated with the called telephone number.

6. A method according to claim 1, wherein the taking an action comprises storing the incoming line identification information in a subscriber's blocked communications list.

7. A method according to claim 1, wherein the receiving the call screening request comprises receiving at least one of a Dual-Tone Multi-Frequency, a softkey entry, and a data message.

* * * * *